United States Patent
Ishikawa et al.

(10) Patent No.: US 7,781,931 B2
(45) Date of Patent: Aug. 24, 2010

(54) SWITCHED RELUCTANCE MOTOR

(75) Inventors: Tomokazu Ishikawa, Nagoya (JP);
Masayuki Nashiki, Komaki (JP);
Yuuichirou Itou, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/081,928

(22) Filed: Apr. 23, 2008

(65) Prior Publication Data

US 2008/0278010 A1 Nov. 13, 2008

(30) Foreign Application Priority Data

May 10, 2007 (JP) ............... 2007-125821

(51) Int. Cl.
*H02K 7/20* (2006.01)
(52) U.S. Cl. ............... 310/112; 310/216.025
(58) Field of Classification Search ........ 310/112, 310/116, 216.025, 216.026, 216.027; 216/25, 216/26, 27
See application file for complete search history.

(56) References Cited

U.S. PATENT DOCUMENTS 4,920,293 A * 4/1990 Kanda ............... 310/116
6,028,385 A * 2/2000 Pengov et al. ......... 310/166

FOREIGN PATENT DOCUMENTS

| JP | U-1-120779 | 8/1989 |
|---|---|---|
| JP | U-1-146771 | 10/1989 |
| JP | A-9-247910 | 9/1997 |
| JP | A-11-266573 | 9/1999 |
| JP | A-2000-350390 | 12/2000 |
| JP | A-2001-186693 | 7/2001 |
| JP | A-2002-010593 | 1/2002 |
| JP | A-2002-44918 | 2/2002 |
| JP | A-2002-44919 | 2/2002 |
| JP | A-2002-253896 | 9/2002 |
| JP | A-2003-339128 | 11/2003 |
| JP | A-2005-176463 | 6/2005 |
| JP | A-2006-42577 | 2/2006 |

OTHER PUBLICATIONS

Japanese Office Action dated Jan. 6, 2009 for Japanese Patent Application No. 2007-125821.
Japanese Notice of Reasons for Rejection dated Jul. 30, 2009, Japanese Application No. 2007-125821 with English-language translation.
Japanese Patent Office, *Notification of Reasons for Rejection for Patent Application No. 2007-125821* (with English translation), dated: Feb. 2, 2010, pp. 1-2 (p. 1 for translation).

* cited by examiner

*Primary Examiner*—Nguyen N Hanh
(74) *Attorney, Agent, or Firm*—Oliff & Berridge, PLC

(57) ABSTRACT

A switched reluctance motor has a rotor and a stator. The stator has first and second stator magnetic pole groups sequentially placed in an axial direction of the rotor. First and second stator magnetic poles in each group are alternately arranged on a same circumference. The first stator magnetic poles are placed every electrical angle $2\pi$ and reversely magnetized to each other. The second stator magnetic poles are placed every electrical angle $2\pi$ and reversely magnetized to each other. The first magnetic pole is apart from the second magnetic pole by electrical angle $\pi$. Each stator magnetic pole in the first stator magnetic pole group is apart from that in the second magnetic pole group by electrical angle $\pi/2$ in the circumferential direction.

13 Claims, 15 Drawing Sheets

CIRCUMFERENTIAL DIRECTION

SWITCHED RELUCTANCE MOTOR

CROSS-REFERENCE TO RELATED APPLICATION

This application is related to and claims priority from Japanese Patent Application No. 2007-125821 filed on May 10, 2007, the contents of which are hereby incorporated by reference.

BACKGROUND OF THE INVENTION

1. Field of the Invention

The present invention relates to a switched reluctance motor to be mounted to motor vehicles and applied as a driving motor driving a compressor built in refrigerators and air conditioning systems.

2. Description of the Related Art

Switched reluctance motors which operate without magnets are well known.

A description will be given of a conventional switched reluctance motor with reference to FIG. 26 to FIG. 28.

FIG. 26 is a vertical cross section of a conventional three phase switched reluctance motor in its axial direction. FIG. 27 shows a transverse cross section of the conventional three phase switched reluctance motor taken along an alternate long and short dash line O-O of FIG. 26. FIG. 28 is a schematic development elevation of stator magnetic poles of a stator, in a rotational direction of the rotor, facing magnetic poles of a rotor in the three phase switched reluctance motor shown in FIG. 26.

The stator 1 has a plurality of stator magnetic poles. Each stator magnetic pole has a concentrated winding 2. The rotor 4 is made of a plurality of magnetic steel sheets which are laminated. As has been well known, the switched reluctance motor has a solid structure and can operate at high rotation speed. Because the switched reluctance motor has no magnet, it can operate under high temperature conditions. Further, because the switched reluctance motor can be made of steel and copper, its manufacturing cost is low. Still further, because the winding can be wound on the stator 1 at the outside of the housing of the switched reluctance motor and the stator 1 with the winding is then assembled in the housing, easily-shapeable aluminum wires can be used. As a result, the switched reluctance motor made of steel and aluminum is easily recyclable.

For example, following four related art documents have disclosed such a type of the switched reluctance motor. Japanese patent laid open publications No. JP 2000-350390, JP 2001-186693, JP 2002-10593, and JP 2002-253896.

However, those conventional switched reluctance motors include the following drawbacks to be improved. In the following explanation, it is defined that a circumferential pitch of the projecting magnetic poles in a rotor is an electrical angle π.

(1) Because the motor has a plurality of discontinuous points at which a motor torque is generated, a torque ripple is often generated. This torque ripple would cause rotational vibration of the motor.

(2) Because each phase in the motor generates a torque power in order when a multi-phase motor drives, the generation of torque power in one of the stator magnetic poles and no generation of torque power in the other stator magnetic poles are simultaneously present on the circumference of the stator. This generates an unbalanced attraction force which is then applied to each magnetic pole. The stator is thereby deformed. The deformed stator further causes vibration and noise during its operation.

(3) In order to avoid the above drawbacks (1) and (2), it is possible to increase the number of the stator magnetic poles. Although this can decrease the magnitude of the attraction power applied to each magnetic pole, the increasing of the stator magnetic poles becomes difficult to keep the necessary space of the stator winding.

(4) Although extending each width of the adjacent stator magnetic poles in the circumferential direction can smoothly shift the motor torque between the stator magnetic poles, there is a possibility of generating a negative torque at the connection node between the adjacent stator magnetic poles if the stator magnetic pole width or a rotor magnetic pole width is not less than 90°. Thus, there is a limit to extend the stator magnetic pole width in order to decrease the fluctuation of the torque power. Considering from such a viewpoint, the conventional switched reluctance motor has the stator magnetic pole width and the rotor magnetic pole width of approximately 60°, as shown in FIG. 28.

There has been proposed another type of a brushless DC motor having a three-dimensional magnetic path structure. However, such a type of brushless motor generates a large amount of eddy current loss by a magnetic flux that flows in the axial direction when a laminated magnetic steel plate is used. In order to avoid this drawback, another conventional technique has proposed a soft magnetic powder material such as a powder magnetic core instead of using magnetic steel sheets that are laminated. However, because this structure of the conventional technique decreases a saturation magnetic flux, the motor characteristic of the brushless motor is thereby decreased.

SUMMARY OF THE INVENTION

It is an object of the present invention to provide a switched reluctance motor capable of reducing torque ripple and vibration noise. The present invention provides a switched reluctance motor with a strong structure and a high torque and capable of rotating at high speed under 囲high-temperature environment. The switched reluctance motor of the present invention can be manufactured with a small size at a low manufacturing cost. The switched reluctance motor according to the present invention has a stator of less deformation capability. This feature provides a low operation noise and less vibration. The switched reluctance motor according to the present invention can be made of a plurality of magnetic steel sheets that are laminated. The following description is based on the condition that the rotor magnetic poles in the rotor are placed on a circumference of the rotor at a predetermined circumferential pitch of electrical angle $2\pi$.

To achieve the above purposes, the present invention provides a switched reluctance motor comprising a stator and a rotor. The rotor is made of soft magnetic material having a rotor magnetic pole group having rotor magnetic poles that radially project and are formed at a predetermined circumferential pitch of electrical angle $2\pi$ on a circumference of the rotor. The stator comprises at least a stator magnetic-pole group having first stator magnetic poles and second stator magnetic poles that radially project and are alternately formed at a predetermined circumferential pitch on a same circumference of the stator, in which the first stator magnetic poles and the second stator magnetic poles are reversely magnetized by a stator coil wound on the first and second stator magnetic poles.

According to the present invention, because the magnetic paths can be formed between the first and second stator magnetic poles formed on the same circumference, it is possible that the stator core and the rotor core can be made of magnetic steel sheets which are laminated. This structure can decrease the manufacturing cost. Further, because this structure can increase magnetic flux density, it is possible to increase the characteristics of the switched reluctance motor

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
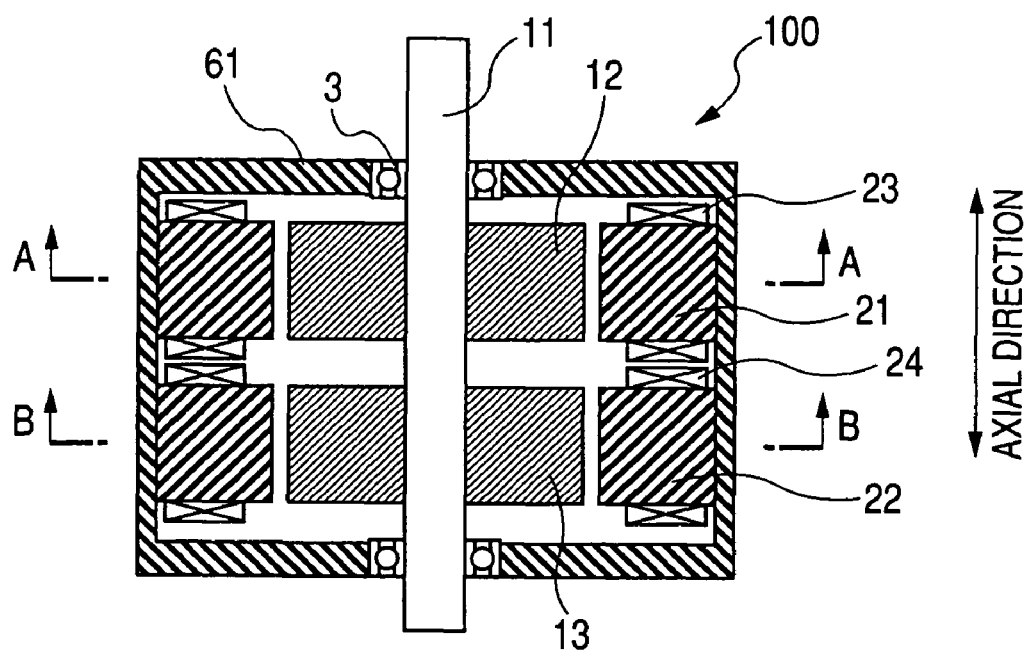
FIG. 1 is a schematic cross section of a switched reluctance motor in its axial direction according to the first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a switched reluctance motor 100 according to a first embodiment of the present invention.

FIG. 1 is a schematic cross section of the switched reluctance motor 100 in its axial direction according to the first embodiment.

The switched reluctance motor 100 has the rotors 12 and 13. The rotors 12 and 13 are fitted and fixed to the rotary shaft 11 while being apart from each other at a predetermined distance in the axial direction of the switched reluctance motor 100.

The rotary shaft 11 is rotatably supported to the housing 61 through bearings 3.

The stators 21 and 22 correspond to the rotors 12 and 13, respectively. Each stator has the cylindrical stator core and the stator coil 23.

In the stator 21, the cylindrical stator core is made of magnetic steel sheets which are laminated. The stator coil 23 is wound on the stator core. Similar to the stator core 21, the cylindrical stator core in the stator 22 is made of magnetic steel sheets which are laminated. In the stator 21, the stator coil 23 is wound on the stator core.

The stators 21 and 22 are separated to each other at a predetermined interval and fixed to the inner peripheral surface of the housing 61. That is, the stators 21 and 22 are sequentially placed in the axial direction of the rotor 11.

The stator 21 is placed at a same position in the axial direction of the switched reluctance motor 100. The inner peripheral surface of the stator 21 faces the outer peripheral surface of the rotor 12 through a small electromagnetic gap.

Similar to the stator 21, the stator 22 is placed at a same position in the axial direction of the switched reluctance motor 100. The inner peripheral surface of the stator 22 faces the outer peripheral surface of the rotor 13 through a small electromagnetic gap.

Figure 2:
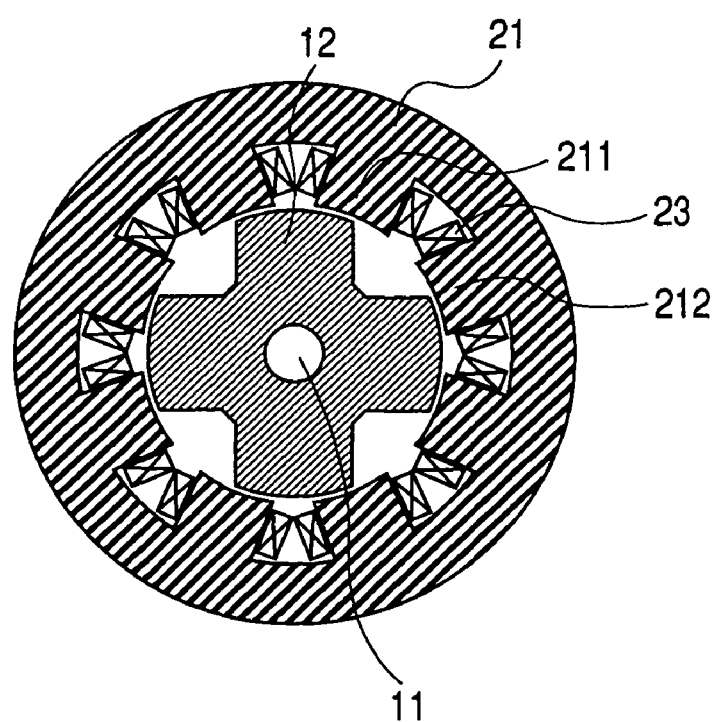
FIG. 2 is a schematic cross section of the switched reluctance motor in its radial direction taken along A-A alternate long and short dash line in FIG. 1.
Figure 3:
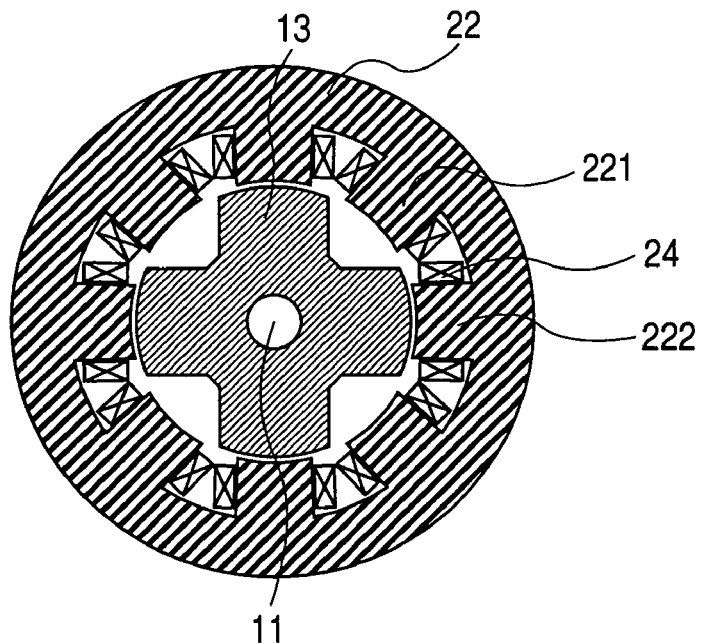
FIG. 3 is a schematic cross section of the switched reluctance motor in its radial direction taken along alternate long and short dash line B-B of FIG. 1.

FIG. 2 is a schematic cross section of the switched reluctance motor 100 in its radial direction taken along A-A alternate long and short dash line in FIG. 1. FIG. 3 is a schematic cross section of the switched reluctance motor in its radial direction taken along alternate long and short dash line B-B of FIG. 1.

As shown in FIG. 2 and FIG. 3, each of the rotors 12 and 13 has the four projecting magnetic poles at every 90 degrees of mechanical angle in its peripheral direction.

(Stator Magnetic Pole Arrangement)

As shown in FIG. 2, the stator 21 has the four projecting stator magnetic poles 211 (or stator magnetic poles also defined in claims) and the four projecting magnetic poles 212 which project toward the inside of the stator 21. The four projecting stator magnetic poles 211 and the four projecting stator magnetic poles 212 project toward the radial inside direction and are alternately arranged in the circumferential direction of the stator 21. Those stator magnetic poles 211 are placed at electrical angle $2\pi$ interval in the stator 21. Those stator magnetic poles 212 are also placed at electrical angle of $2\pi$ interval in the stator 21.

The stator magnetic pole 211 and the stator magnetic pole 212 in the stator 21 are shifted to each other by electrical angle $\pi$. A concentrated winding is wound on each of the stator magnetic poles 211 and 212.

As shown in FIG. 3, the stator 22 has the four projecting magnetic poles 221 (as stator magnetic poles defined in claims) and the four projecting magnetic poles 222 which project toward the inside of the stator 22. The four projecting magnetic poles 221 and the four projecting magnetic poles 222 project toward the radial inside direction and are alternately arranged in the circumferential direction of the stator 22. Each stator magnetic pole 221 is placed at electrical angle $2\pi$ in the stator 22. Each stator magnetic pole 222 is also placed at electrical angle $2\pi$ in the stator 22.

The stator magnetic pole 221 and the stator magnetic pole 222 in the stator 22 are shifted to each other by electrical angle $\pi$. A concentrated winding is wound on each of the stator magnetic poles 211 and 212.

Further, the stator magnetic poles 211 and 212 in the stator 21 and the stator magnetic poles 221 and 222 in the stator 22 are shifted in the circumferential direction by electrical angle of $\pi/2$ (90 degrees).

Next, a description will now be given of the stator magnetic electrodes 211, 212, 221, and 222 with reference to FIG. 4.

Figure 4:
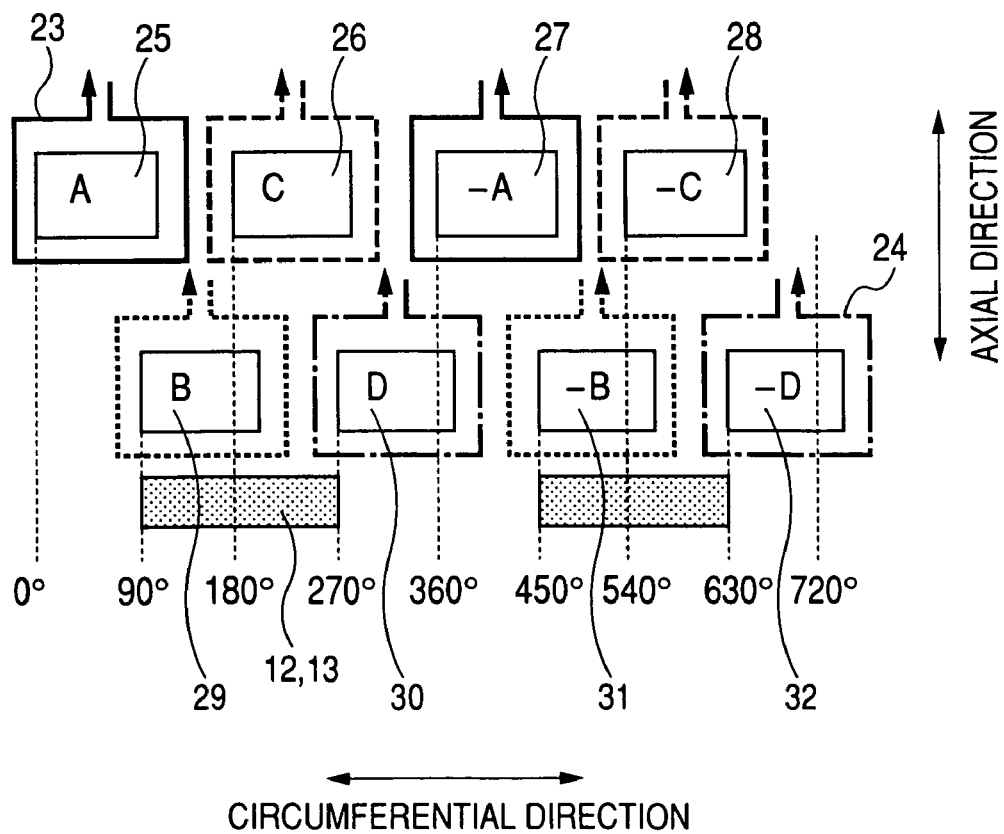
FIG. 4 is a schematic development elevation of stator magnetic poles in the switched reluctance motor in its circumferential direction shown in FIG. 1.

FIG. 4 is a schematic development elevation of the stator magnetic poles in the switched reluctance motor 100 in its circumferential direction shown in FIG. 1.

The horizontal axis in FIG. 4 shows various electrical angles (as an electrical angle based on the magnetic rotor pole pitch) that are defined when the pitch of the adjacent projecting magnetic poles in the rotor 13 on the same circumference are electrical angle $2\pi$.

Since the switched reluctance motor only uses magnetic attraction force, an electrical angle $\pi$ in the rotary magnetic field of an usual AC motor can be seen as electrical angle $2\pi$ of the switched reluctance motor 100.

The stator magnetic poles 211 in the stator 21 shown in FIG. 2 correspond to the stator magnetic poles 25 and 27 shown in FIG. 4. The stator magnetic poles 25 and 27 are placed every electrical angle $2\pi$ shown in FIG. 4. Similarly, the stator magnetic poles 212 in the stator 22 shown in FIG. 2 correspond to the stator magnetic poles 26 and 28 shown in FIG. 4. The stator magnetic poles 26 and 28 are placed every electrical angle $2\pi$ shown in FIG. 4. As shown in FIG. 2 and FIG. 4, the stator magnetic poles 25 and 27 and the stator magnetic poles 26 and 28 are alternately placed on the same circumference.

The stator coil 23 is wound on the stator magnetic pole 25. The stator coil 23 generates a positive A-phase magnetic flux in the stator magnetic pole 25. The stator coil 23 generates a negative A-phase magnetic flux in the stator magnetic pole 27. A current reversely flows in the stator coil 23 wound in the stator magnetic pole 25 and the stator coil 23 wound in the stator magnetic pole 27.

The stator coil 23 generates a positive C-phase magnetic flux in the stator magnetic pole 26. The stator coil 23 generates a negative C-phase magnetic flux in the stator magnetic pole 27.

A current reversely flows in the stator coil 23 wound on the stator magnetic pole 26 and the stator coil 23 wound on the stator magnetic pole 28.

As shown in FIG. 4, the phase of the magnetic flux in the positive A-phase and the phase of the magnetic flux in the negative A-phase are shifted by electrical angle $2\pi$. The phase of the magnetic flux in the positive C-phase and the phase of the magnetic flux in the negative C-phase are shifted by electrical angle $\pi$. The phase of the magnetic flux in the positive A-phase and the phase of the magnetic flux in the positive C-phase are shifted by electrical angle $\pi$.

Accordingly, the stator 21 has the four-phase stator structure. In this case, the magnetic flux in the positive A-phase and the magnetic flux in the negative A-phase can be easily realized using stator coils which are reversely wound. Because the magnetic flux in the positive C-phase and the negative C-phase can also be realized using the stator coils which are reversely wound, the stator coil 23 is substantially composed of two phase windings.

The stator magnetic poles 221 in the stator 22 are shown as the stator magnetic poles 29 and 31 that are alternately arranged in FIG. 4.

The stator magnetic poles 222 in the stator 21 are shown as the stator magnetic poles 30 and 32 that are alternately arranged in FIG. 4.

A positive B-phase magnetic flux is generated by the stator coil 24 wound on the stator magnetic pole 29. A negative B-phase magnetic flux is generated by the stator coil 24 wound on the stator magnetic pole 31. A current reversely flows in the stator coil 24 wound in the stator magnetic pole 29 and the stator coil 24 wound in the stator magnetic pole 31.

A positive D-phase magnetic flux is generated by the stator coil 24 wound on the stator magnetic pole 30. A negative D-phase magnetic flux is generated by the stator coil 24 wound on the stator magnetic pole 32. A current reversely flows in the stator coil 24 wound in the stator magnetic pole 30 and the stator coil 23 wound in the stator magnetic pole 32.

The phase of the magnetic flux in the positive B-phase and the phase of the magnetic flux in the negative B-phase are shifted by electrical angle $2\pi$. The phase of the magnetic flux in the positive D-phase and the phase of the magnetic flux in the negative D-phase are shifted by electrical angle $\pi$. The phase of the magnetic flux in the positive B-phase and the phase of the magnetic flux in the positive D-phase are shifted by electrical angle $\pi$. Accordingly, the stator 22 has the four-phase stator structure. In this case, the magnetic flux in the positive B-phase and the magnetic flux in the negative B-phase can be easily realized using stator coils which are reversely wound.

Because the magnetic flux in the positive D-phase and the negative D-phase can also be realized using the stator coils which are reversely wound, (or by a reverse current flow), the stator coil 23 can be substantially composed of two phase windings.

It is thereby possible to form the total eight stator magnetic poles using the stator coil substantially composed of the four phase windings.

The total eight stator magnetic poles can be realized using the four phase windings. This structure of the stator magnetic poles 25 to 32 arranged every electrical angle $\pi/2$ in the circumferential direction can generate alternative magnet fluxes which are shifted in order by electrical angle $\pi/2$.

By the way, FIG. 4 shows the electrical angles from 0 degree to 720 degrees along the horizontal axis which is twice as large as for an ordinary motor. The reason why is as follows. Because the switched reluctance motor only uses magnetic attraction force, the magnetic attraction force generated of the magnetic poles in the positive A-phase is substantially equal to that in the negative A-phase.

(Effects)

The switched reluctance motor according to the first embodiment has the first stator magnetic pole group having the stator magnetic poles 25 to 28 and the second stator magnetic pole group having the stator magnetic poles 29 to 32. The stator magnetic poles 25 to 28 in the first stator magnetic pole group are arranged on a same circumference. The stator magnetic poles 29 to 32 in the second stator magnetic pole group are arranged on the other same circumference. The first and second stator magnetic pole groups are sequentially placed in the axial direction of the rotor 11.

In particular, the stator magnetic poles 25 to 28 in the first stator magnetic pole group and the stator magnetic poles 29 to 32 in the second stator magnetic pole group are respectively shifted in the circumferential direction by a half of the phase angle (as the electrical angle $\pi$). This structure of the stator poles can improve the propagation of the torque and thereby decrease the torque ripple. It is therefore possible to decrease the magnitude of vibration and noise of the switched reluctance motor when compared with those of the conventional motors.

Further, the structure of the switched reluctance motor of the first embodiment allows each stator pole to have a width in the circumferential direction. This structure enables the adjacent magnetic poles arranged in the axial direction to overlap in the circumferential direction to each other. It is therefore possible to improve the balanced magnetic attraction force to be applied to the rotor 12 and to also improve the balanced magnetic attraction force to be applied to the rotor 13.

That is, it is possible to widen each stator pole width in the circumferential direction by approximately electrical angle $\pi/2$ (as the electrical angle $\pi$ in views of an absolute period of a magnetic attraction force waveform). For example, the magnetic attraction force can be smoothly shifted from the A-phase to the B-phase, for example.

Figure 26:
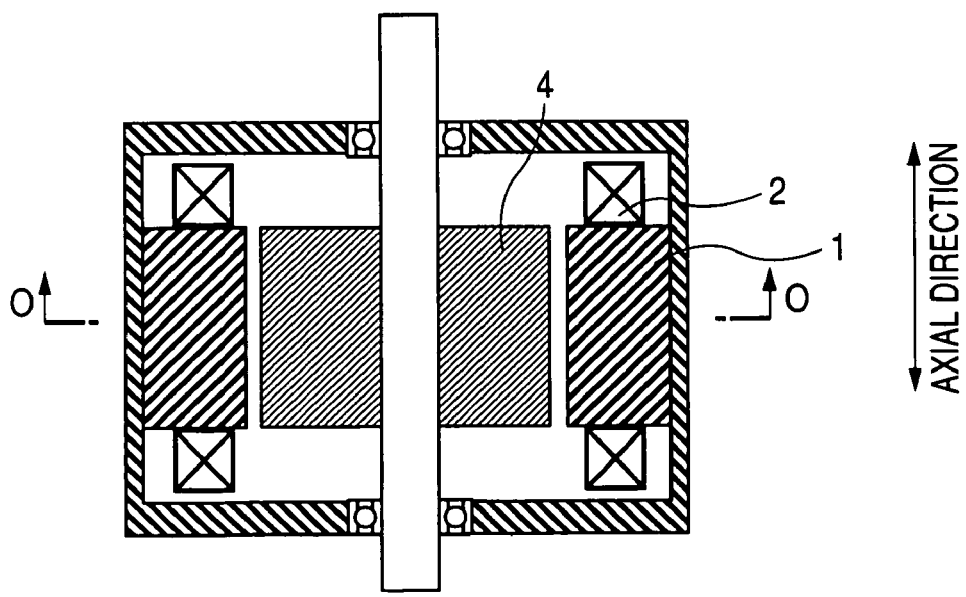
FIG. 26 is a vertical cross section of a conventional three-phase switched reluctance motor in its axial direction.
Figure 27:
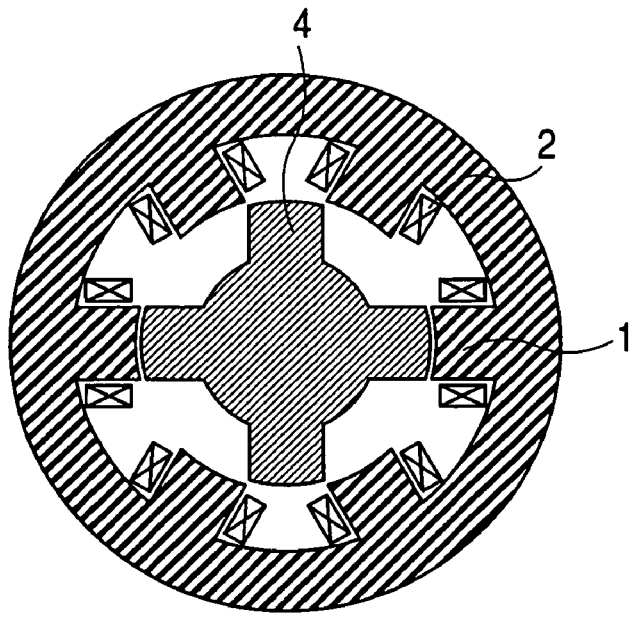
FIG. 27 shows a transverse cross section of the conventional three-phase switched reluctance motor taken along alternate long and short dash line O-O of FIG. 26.
Figure 28:
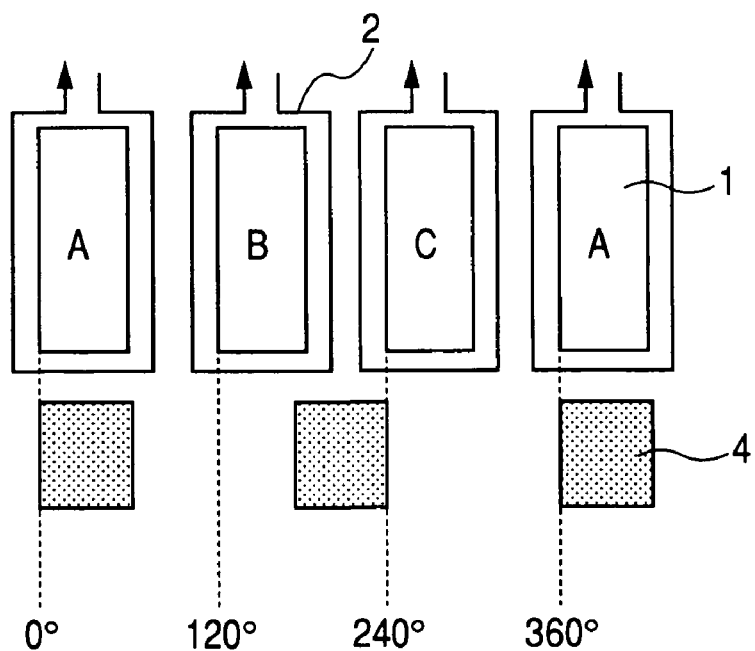
FIG. 28 is a schematic development elevation of stator magnetic poles of a stator, in its rotation direction of the rotor, facing a rotor in the three-phase switched reluctance motor shown in FIG. 26.

On the other hand, the conventional switched reluctance motor, as shown in FIG. 26 to FIG. 28, has the three-phase projecting magnetic poles (stator poles) arranged on a same circumference. In the conventional switched reluctance motor, one-phase projecting magnetic pole generates a magnetic force, the corresponding other two-phase projecting magnetic poles do not generate any magnetic force. This generates unbalanced magnetic attraction forces between the projecting magnetic poles, and the unbalanced magnetic attraction force causes a deformation of the stator, and as a result, vibration and noise are thereby increased. Still further, because the three-phase conventional switched reluctance motor has the limitation that each of the stator magnetic poles and the projecting magnetic poles of the rotor occupies approximately 60 degrees in the circumferential direction at the most, the range of torque ripple is increased when the torque generation point is switched.

On the other hand, the switched reluctance motor according to the first embodiment of the present invention can decrease the magnitude of the torque ripple and the vibration noise.

(Modification)

A description will now be given of a modification of the switched reluctance motor according to the first embodiment of the present invention with reference to FIG. 5 to FIG. 7.

Figure 5:
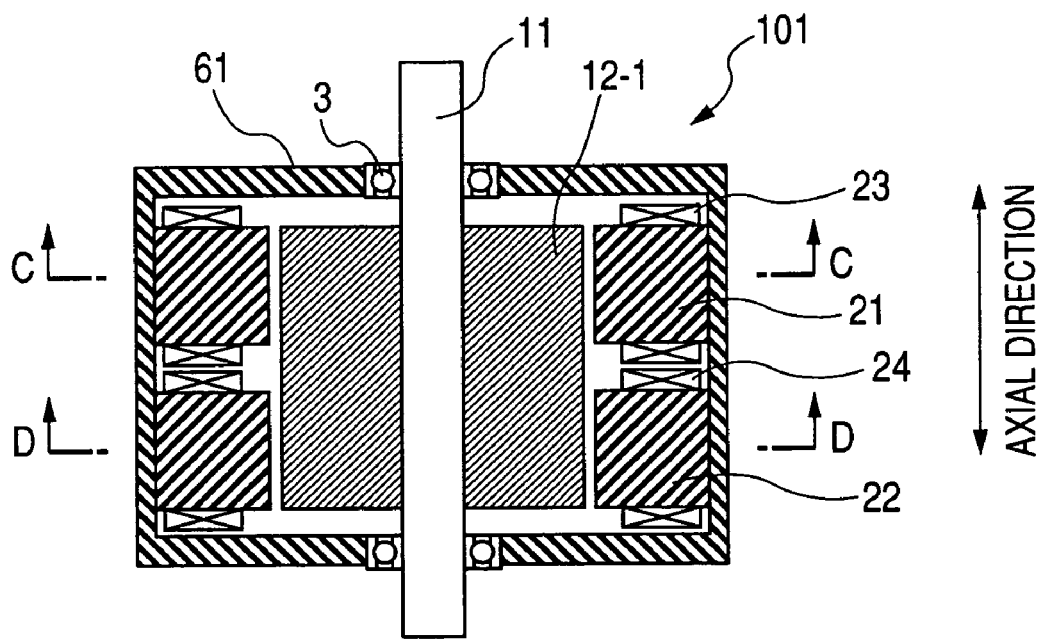
FIG. 5 is a schematic cross section of the switched reluctance motor in its axial direction as a modification according to the first embodiment of the present invention.

FIG. 5 is a schematic cross section of the switched reluctance motor 101 in its axial direction as the modification according to the first embodiment. FIG. 6 is a schematic cross section of the switched reluctance motor 101 in its radial direction taken along alternate long and short dash line C-C of FIG. 5. FIG. 7 is a schematic cross section of the switched reluctance motor 101 in its radial direction taken along alternate long and short dash line D-D of FIG. 5.

Figure 6:
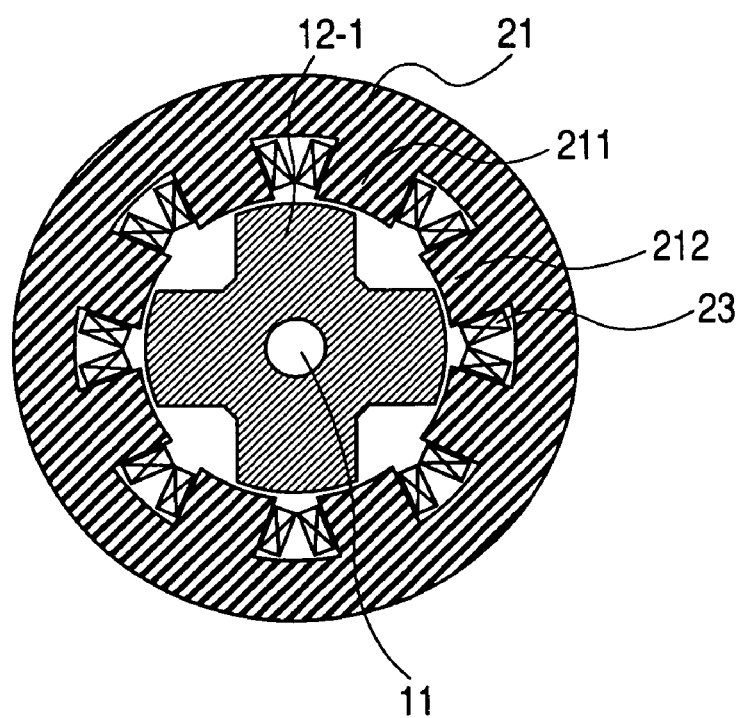
FIG. 6 is a schematic cross section of the switched reluctance motor in its radial direction taken along alternate long and short dash line C-C of FIG. 5.
Figure 7:
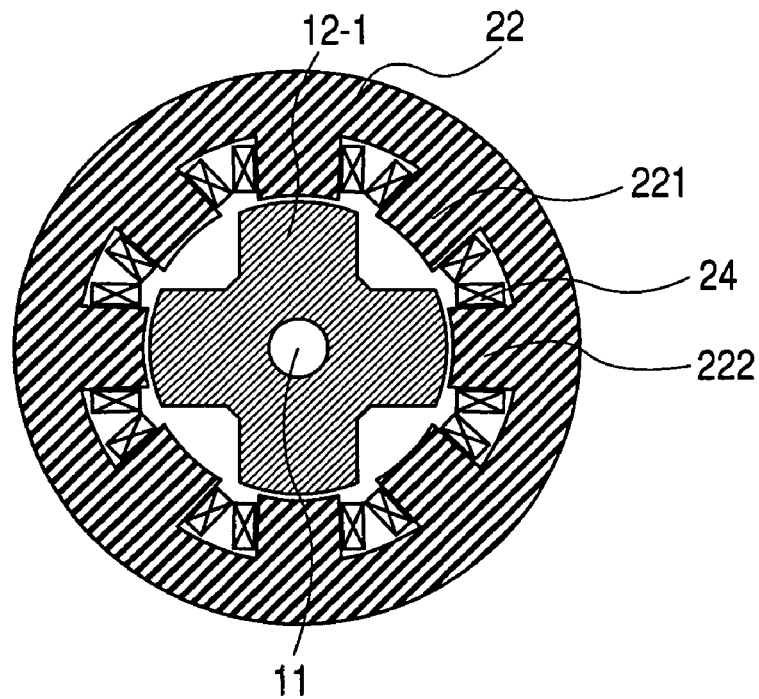
FIG. 7 is a schematic cross section of the switched reluctance motor in its radial direction taken along alternate long and short dash line D-D of FIG. 5.

The modification of the switched reluctance motor 101 shown in FIG. 5 to FIG. 7 only has the rotor 12-1 made of a plurality of magnetic steel sheets which are laminated. The rotor 12-1 is a combination of the rotor 12 and the rotor 13 shown in FIG. 1. The switched reluctance motor as the modification shown in FIG. 5 to FIG. 7 has the same effects of the switched reluctance motor according to the first embodiment.

Second Embodiment

A description will now be given of the switched reluctance motor 400 according to the second embodiment of the present invention with reference to FIG. 8 to FIG. 12.

The switched reluctance motor 400 according to the second embodiment basically has the same configuration of the switched reluctance motor according to the first embodiment shown in FIG. 1 to FIG. 4. The feature of the second embodiment which is different from that of the first embodiment will be mainly described.

Figure 8:
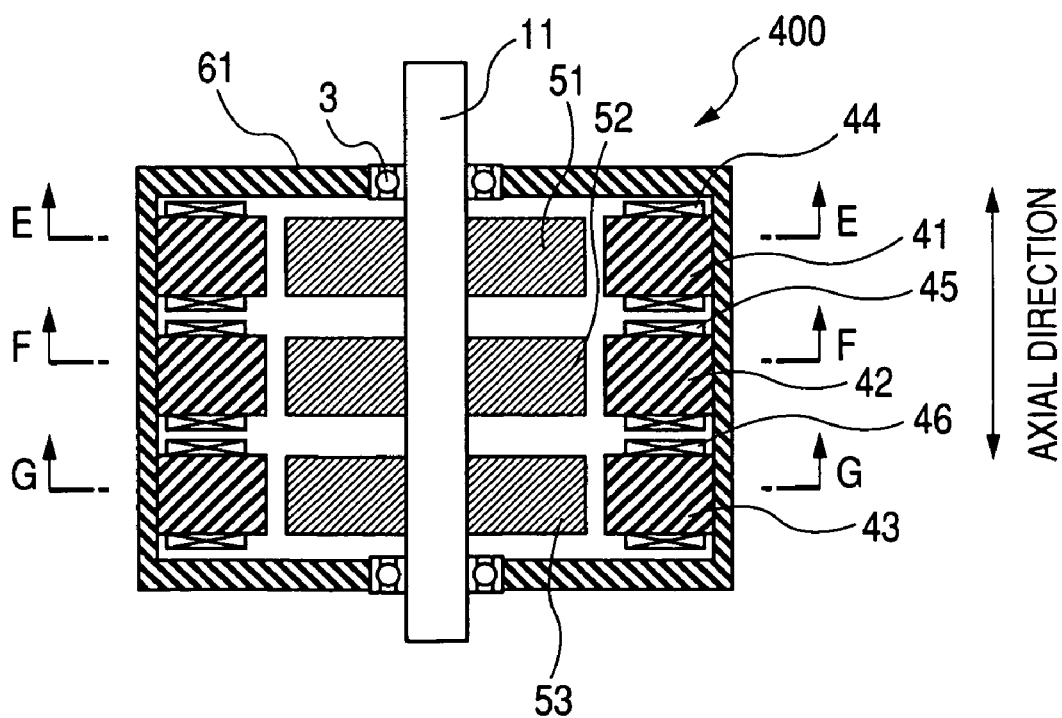
FIG. 8 is a schematic cross section of a switched reluctance motor in its axial direction according to the second embodiment of the present invention.
Figure 9:
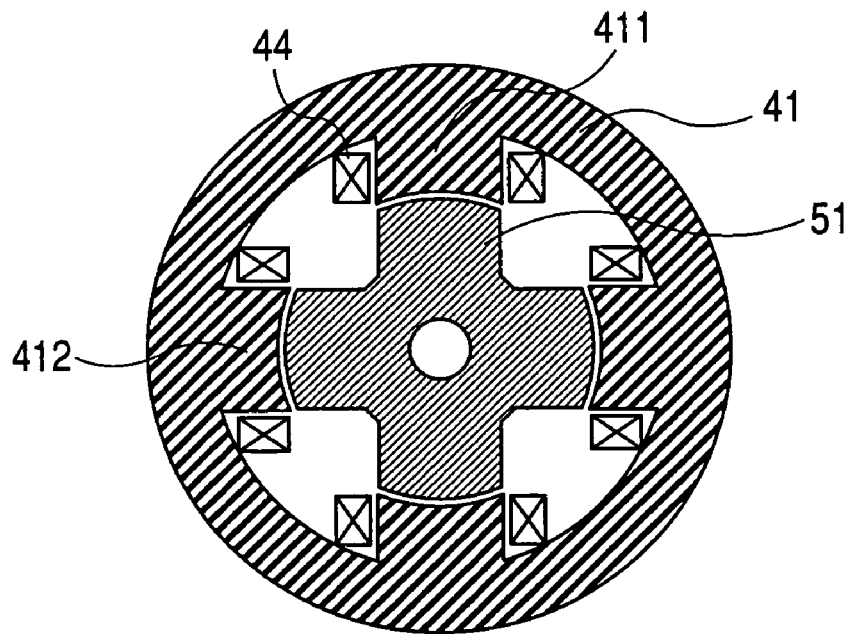
FIG. 9 is a schematic cross section of the switched reluctance motor in its radial direction taken along alternate long and short dash line E-E of FIG. 8.
Figure 10:
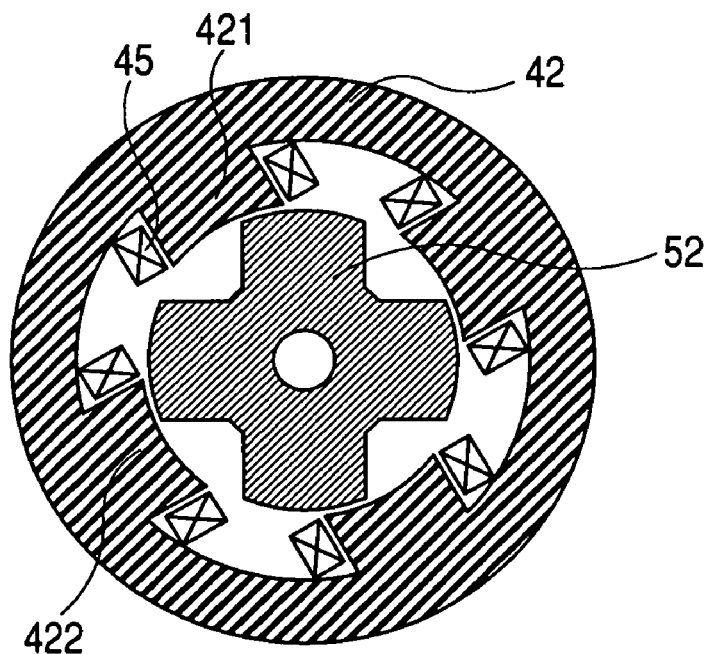
FIG. 10 is a schematic cross section of the switched reluctance motor in its radial direction taken along alternate long and short dash line F-F of FIG. 8.
Figure 11:
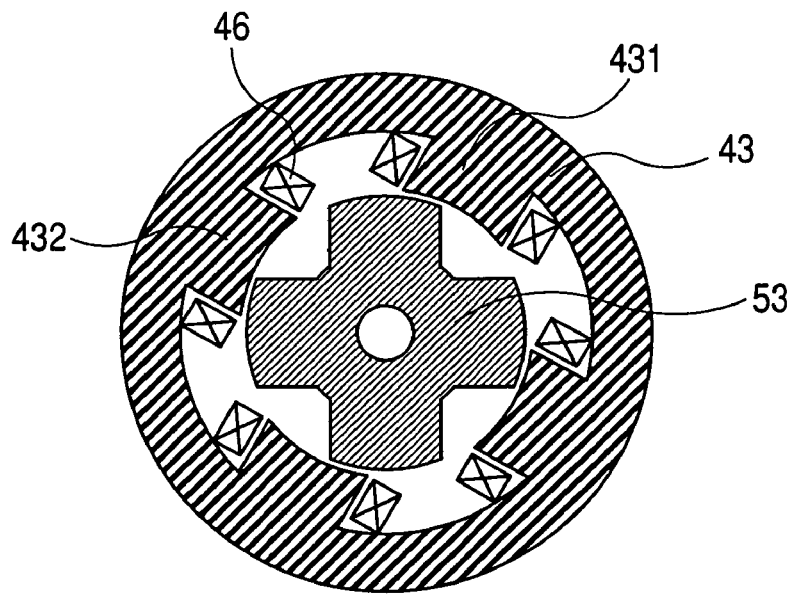
FIG. 11 is a schematic cross section of the switched reluctance motor in its radial direction taken along alternate long and short dash line G-G of FIG. 8.
Figure 12:
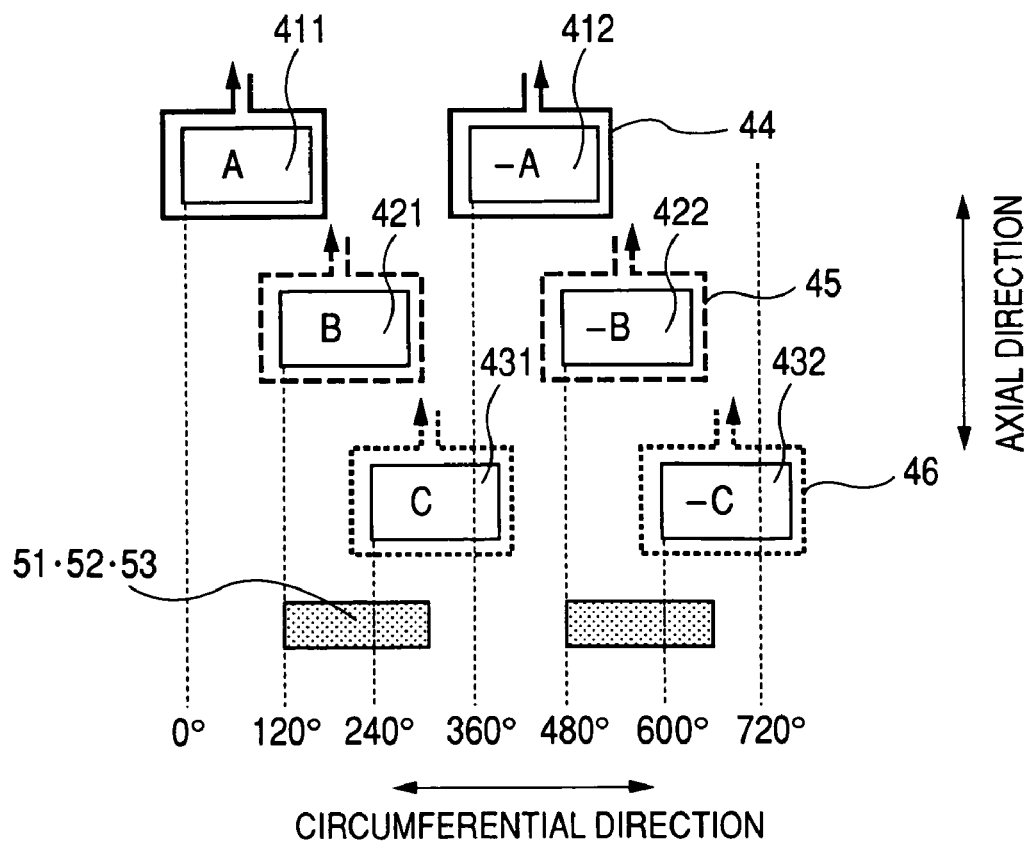
FIG. 12 is a schematic development elevation of stator magnetic poles in the switched reluctance motor toward its circumferential direction shown in FIG. 6 to FIG. 11.

FIG. 8 is a schematic cross section of the switched reluctance motor 400 in its axial direction according to the second embodiment. FIG. 9 is a schematic cross section of the switched reluctance motor 400 in its radial direction taken along an alternate long and short dash line E-E of FIG. 8. FIG. 10 is a schematic cross section of the switched reluctance motor 400 in its radial direction taken along alternate long and short dash line F-F of FIG. 8. FIG. 11 is a schematic cross section of the switched reluctance motor 400 in its radial direction taken along an alternate long and short dash line G-G of FIG. 8. FIG. 12 is a schematic development elevation of stator magnetic poles in the switched reluctance motor 400 toward its circumferential direction shown in FIG. 6 to FIG. 11.

Similar to FIG. 4, the horizontal axis in FIG. 12 shows various electrical angles (as electrical angles based on the rotor magnetic pole pitch) when the pitch of the adjacent projecting magnetic poles of the rotors 51, 52, and 53 is defined as electrical angle 2π.

The following description uses an ordinary electrical angle (as the electrical angle based on the waveform of a stator magnetic flux) in which one period of the waveform of the stator magnetic flux is equal to the electrical angle 2π.

The switched reluctance motor 400 is a three-phase switched reluctance motor and comprises the stators 41, 42 and 43, the rotors 51, 52 and 53, and the rotor shaft 11. The phase winding 44 is wound on the stator core of the stator 41. The phase winding 45 is wound on the stator core of the stator 42. The phase winding 46 is wound on the stator core of the stator 43.

As shown in FIG. 12, the stator magnetic poles 411 and 412 in the stator 41 are alternately arranged in the circumferential direction every electrical angle 2π. The stator magnetic poles 421 and 422 in the stator 42 are alternately arranged in the circumferential direction every electrical angle 2π. The stator magnetic poles 431 and 432 in the stator 43 are alternately arranged in the circumferential direction every electrical angle 2π.

As shown in FIG. 12, the stator magnetic pole 421 is shifted to the stator magnetic pole 411 by electrical angle 2π/3. The stator magnetic pole 431 is shifted to the stator magnetic pole 421 by electrical angle 2π/3. The stator poles in the stators 41 to 43 are shifted to each other in the circumferential direction by electrical angle 2π/3 (120°). Because this arrangement of the stators 41, 42, and 43 increases the circumferential occupation width of each stator magnetic pole, the second embodiment has the same effect of the first embodiment. The stator magnetic pole group on the same circumferential direction is composed of the two types of the stator magnetic poles. These two types of the stator magnetic poles are the first stator magnetic poles and the second stator magnetic poles defined in claims according to the present invention. Those two types of the stator magnetic poles are separated to each other by electrical angle π and substantially have one phase winding.

The three stator magnetic poles are placed in order in the axial direction by the rotary shaft 11 in the switched reluctance motor 400, and overlapped to each other in the circumferential direction.

(Modification)

A description will now be given of a modification of the switched reluctance motor according to the second embodiment of the present invention with reference to FIG. 13.

Figure 13:
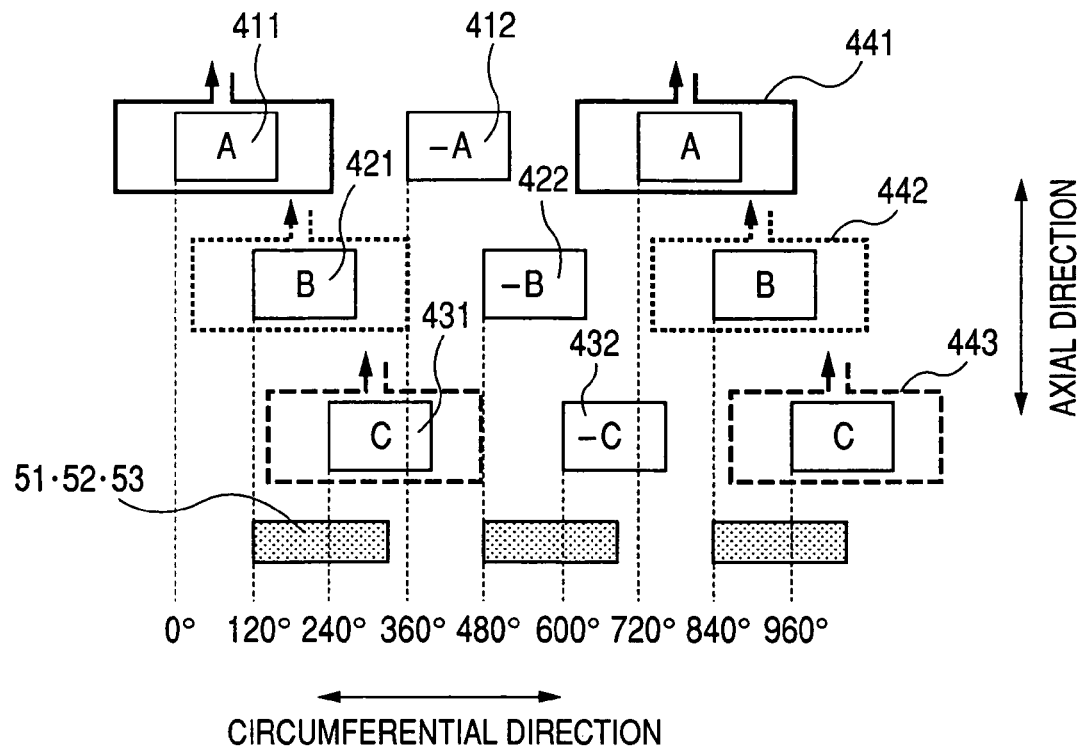
FIG. 13 is a schematic development elevation of the switched reluctance motor in its circumferential direction as a modification of FIG. 12.

FIG. 13 is a schematic development elevation of the switched reluctance motor in its circumferential direction as a modification of FIG. 12. In the modification of the switched reluctance motor shown in FIG. 13, the phase winding 441 is substantially wound on the stator magnetic pole 411, the phase winding 442 is substantially wound on the stator magnetic pole 421, and the phase winding 443 is substantially wound on the stator magnetic pole 431. This structure enables the stator magnetic pole 411 and the stator magnetic pole 412 to be reversely magnetized to each other, the stator magnetic pole 421 and the stator magnetic pole 422 to be reversely magnetized to each other, and the stator magnetic pole 432 and the stator magnetic pole 431 to also be reversely magnetized to each other. The structure of the modification shown in FIG. 13 has the same effect of the second embodiment shown in FIG. 12. The modification shown in FIG. 13 can take a concentrated winding or a single-phase winding.

(Another Modification)

A description will now be given of a modification of the switched reluctance motor according to the second embodiment with reference to FIG. 14.

Figure 14:
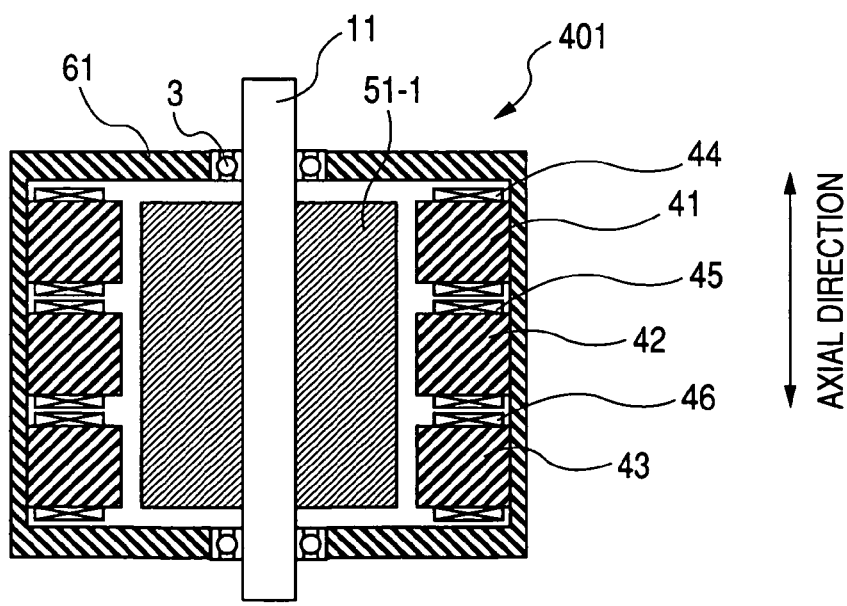
FIG. 14 is a schematic cross section of the switched reluctance motor in its axial direction as a modification of FIG. 8.

FIG. 14 is a schematic cross section of the switched reluctance motor 401 in its axial direction as a modification of FIG. 8. The modification of the second embodiment shown in FIG. 14 has the single rotor 51-1. The single rotor 51-1 in the switched reluctance motor 401 corresponds to the rotor composed of the rotors 51, 52, and 53 in the switched reluctance motor 400.

The single rotor 51-1 is made of a plurality of magnetic steel sheets which are laminated. The switched reluctance motor as the modification shown in FIG. 14 has the same effects of the switched reluctance motor according to the second embodiment shown in FIG. 8.

Third Embodiment

A description will now be given of the switched reluctance motor 700 according to the third embodiment of the present invention with reference to FIG. 15 to FIG. 21.

The switched reluctance motor 700 according to the third embodiment basically has the same configuration of the switched reluctance motor according to the first and second embodiments. The feature of the third embodiment which is different from those of the first and second embodiments will be mainly described.

Figure 15:
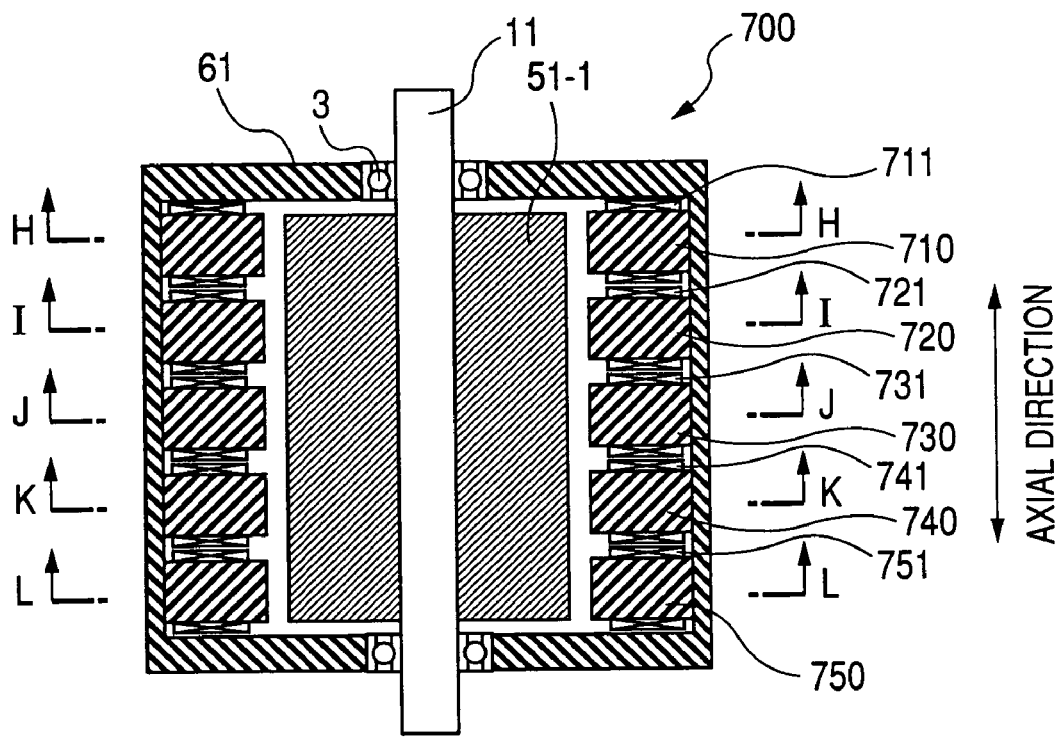
FIG. 15 is a schematic cross section of a switched reluctance motor in its axial direction according to the third embodiment of the present invention.
Figure 16:
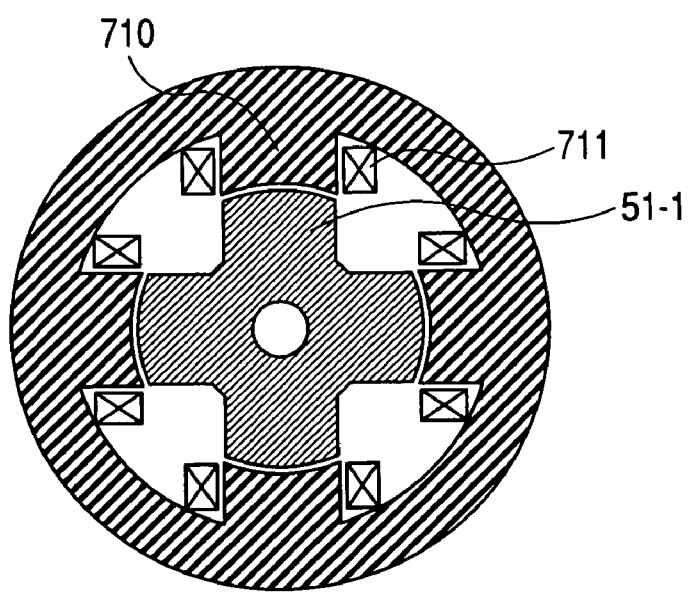
FIG. 16 is a schematic cross section of the switched reluctance motor in its radial direction taken along alternate long and short dash line H-H of FIG. 15.
Figure 17:
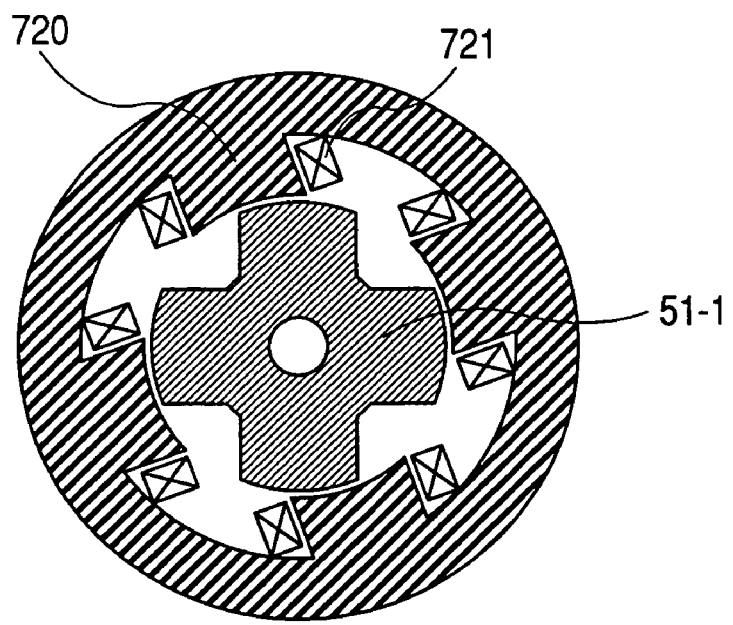
FIG. 17 is a schematic cross section of the switched reluctance motor in its radial direction taken along alternate long and short dash line I-I of FIG. 18.
Figure 18:
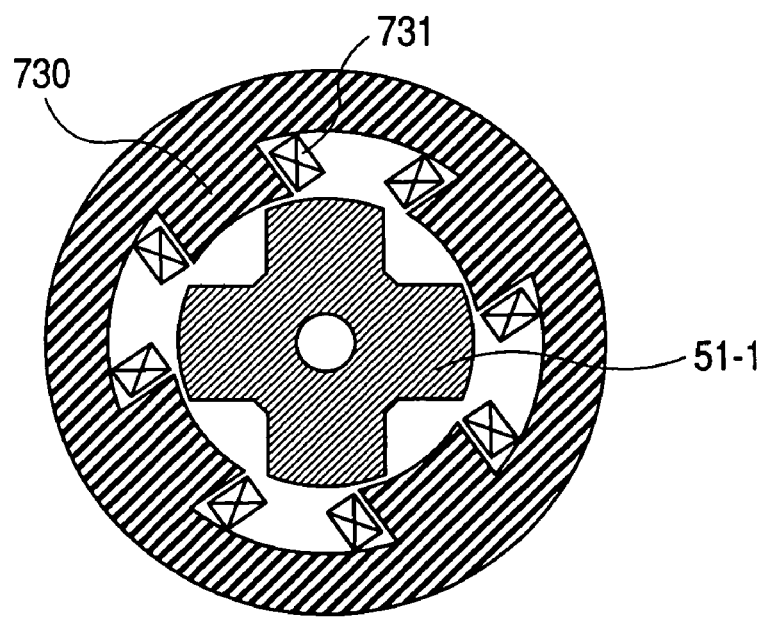
FIG. 18 is a schematic cross section of the switched reluctance motor in its radial direction taken along alternate long and short dash line J-J of FIG. 15.
Figure 19:
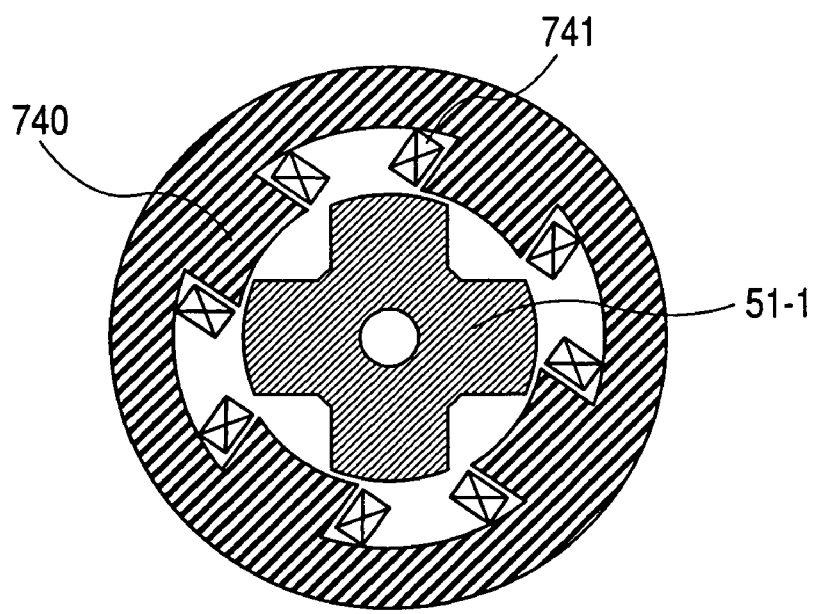
FIG. 19 is a schematic cross section of the switched reluctance motor in its radial direction taken along alternate long and short dash line K-K of FIG. 15.
Figure 20:
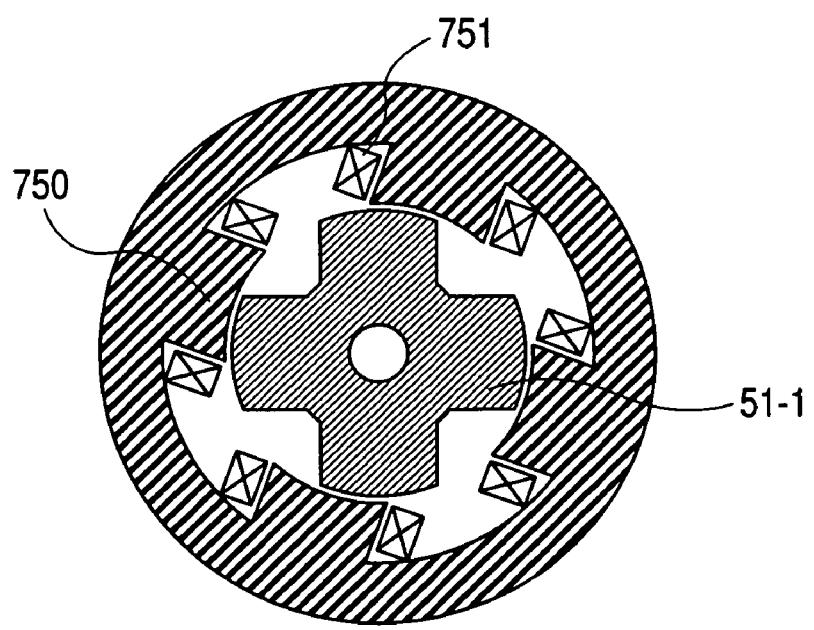
FIG. 20 is a schematic cross section of the switched reluctance motor in its radial direction taken along alternate long and short dash line L-L of FIG. 15.
Figure 21:
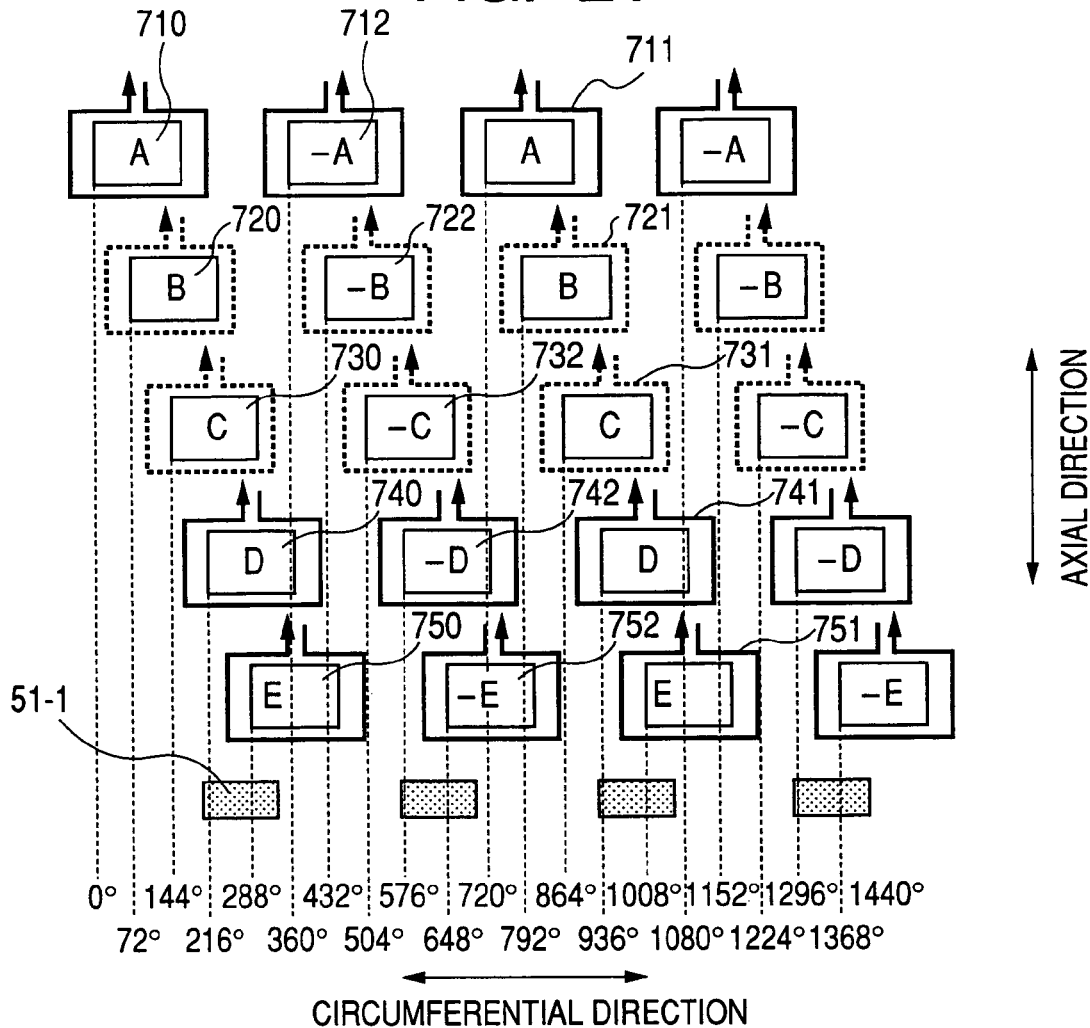
FIG. 21 is a schematic development elevation of stator magnetic poles in the switched reluctance motor toward its circumferential direction shown in FIG. 15.

FIG. 15 is a schematic cross section of the switched reluctance motor 700 in its axial direction according to the third embodiment. FIG. 16 is a schematic cross section of the switched reluctance motor 700 in its radial direction taken along alternate long and short dash line H-H of FIG. 15. FIG. 17 is a schematic cross section of the switched reluctance motor 700 in its radial direction taken along alternate long and short dash line I-I of FIG. 18. FIG. 18 is a schematic cross section of the switched reluctance motor in its radial direction taken along alternate long and short dash line J-J of FIG. 15. FIG. 19 is a schematic cross section of the switched reluctance motor 700 in its radial direction taken along alternate long and short dash line K-K of FIG. 15. FIG. 20 is a schematic cross section of the switched reluctance motor 700 in its radial direction taken along alternate long and short dash line L-L of FIG. 15. FIG. 21 is a schematic development elevation of stator magnetic poles in the switched reluctance motor 700 toward its circumferential direction shown in FIG. 15.

Similar to FIG. 12, the horizontal axis in FIG. 21 shows various electrical angles (as an electrical angle based on the rotor magnetic pole pitch) that are defined when the pitch of the adjacent projecting magnetic poles in the rotor 51-1 on a same circumference is the electrical angle 2π.

The following description uses an ordinary electrical angle (as the electrical angle based on the waveform of a stator magnetic flux) in which one period of the waveform of the stator magnetic flux is equal to the electrical angle 2π.

Since the switched reluctance motor only uses magnetic attraction force, an electrical angle π in the rotary magnetic field of an usual AC motor can be seen as electrical angle 2π of the switched reluctance motor 100.

The switched reluctance motor 700 of the third embodiment is a five-phase and ten magnetic pole switched reluctance motor having the single rotor 51-1.

In the switched reluctance motor 700, the stator magnetic poles 710 and 712 are alternately placed in the circumferential direction every electrical angle 2π.

The stator magnetic poles 710 and 712 are reversely magnetized to each other by the phase winding 711 using a reverse current flow. The stator magnetic poles 720 and 722 are alternately placed in the circumferential direction every electrical angle $2\pi$. The stator magnetic poles 720 and 722 are reversely magnetized to each other by the phase winding 721 using a reverse current flow. The stator magnetic poles 730 and 732 are alternately placed in the circumferential direction every electrical angle $2\pi$. The stator magnetic poles 730 and 732 are reversely magnetized to each other by the phase winding 731 using a reverse current flow. The stator magnetic poles 740 and 742 are alternately placed in the circumferential direction every electrical angle $2\pi$. The stator magnetic poles 740 and 742 are reversely magnetized to each other by the phase winding 741 using a reverse current flow. The stator magnetic poles 750 and 752 are alternately placed in the circumferential direction every electrical angle $2\pi$. The stator magnetic poles 750 and 752 are reversely magnetized to each other by the phase winding 751 using a reverse current flow.

In the switched reluctance motor 700, each stator magnetic pole group has the magnetic poles which are alternately arranged every electrical angle $2\pi$ and the five stator magnetic pole groups are placed around the rotor 51-1 in the axial direction. Each stator magnetic pole in each magnetic pole group is arranged in the circumferential direction every electrical angle 72 degrees.

According to the third embodiment of the present invention, it is possible to arrange the necessary number of the stator magnetic pole groups in the axial direction of the switched reluctance motor. This structure can increase the torque overlapped between the adjacent magnetic poles by increasing the number of the magnetic poles arranged in the circumferential direction. The switched reluctance motor 700 of the third embodiment has the same effects of the switched reluctance motors of the first and second embodiments.

(Modification)

In the structure of the switched reluctance motor 700 according to the third embodiment shown in FIG. 15 to FIG. 21, the five stator magnetic pole groups are sequentially arranged in the axial direction. Although the structure of the switched reluctance motor 700 has the odd number stator magnetic pole groups, the present invention is not limited by this structure, for example, it is possible that the switched reluctance motor 700 has an even number of the stator magnetic pole groups which are placed in axial direction.

Fourth Embodiment

A description will now be given of the switched reluctance motor 800 according to the fourth embodiment of the present invention with reference to FIG. 22 to FIG. 25.

The switched reluctance motor 800 according to the fourth embodiment basically has the same configuration of the switched reluctance motor according to the first to third embodiments. The feature of the fourth embodiment that is different from those of the first to third embodiments will be described.

Figure 22:
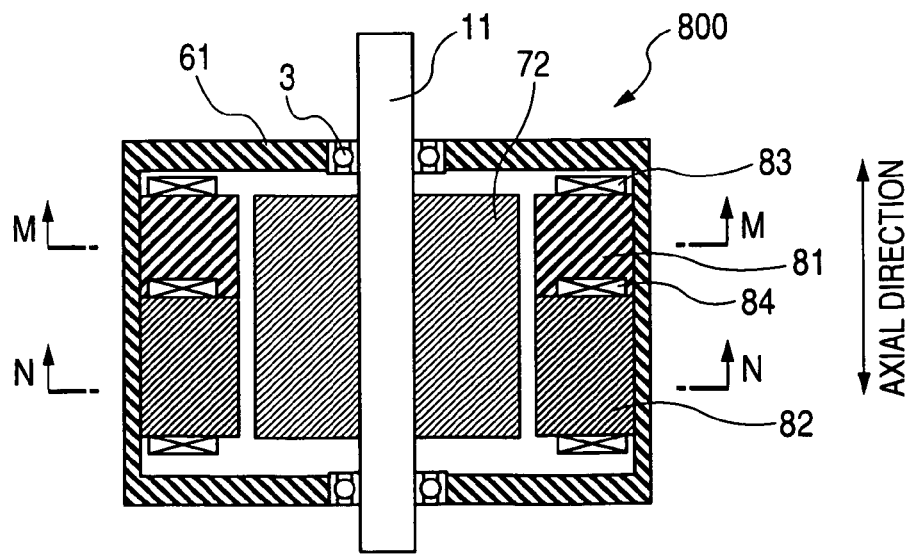
FIG. 22 is a schematic cross section of a switched reluctance motor in its axial direction according to the fourth embodiment of the present invention.
Figure 23:
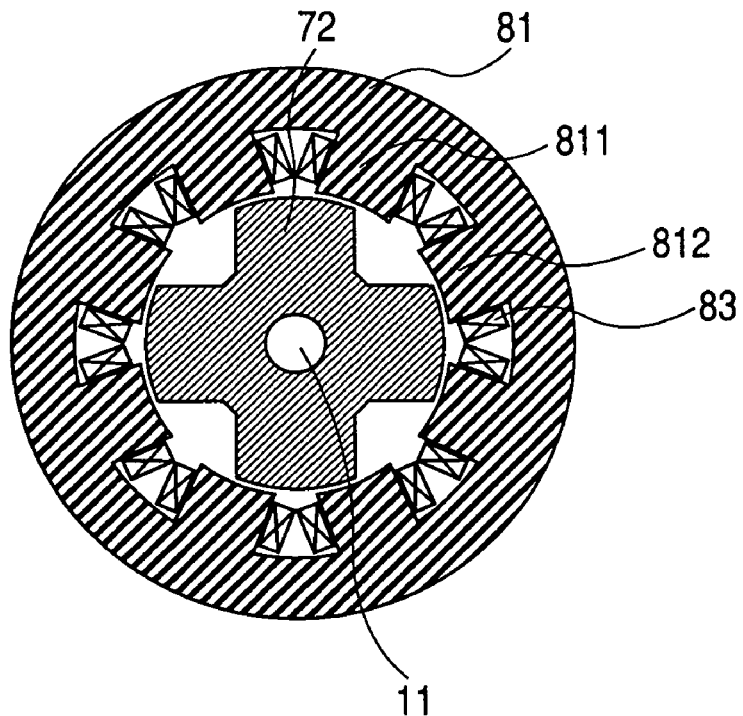
FIG. 23 is a schematic cross section of the switched reluctance motor in its radial direction taken along alternate long and short dash line M-M of FIG. 22.
Figure 24:
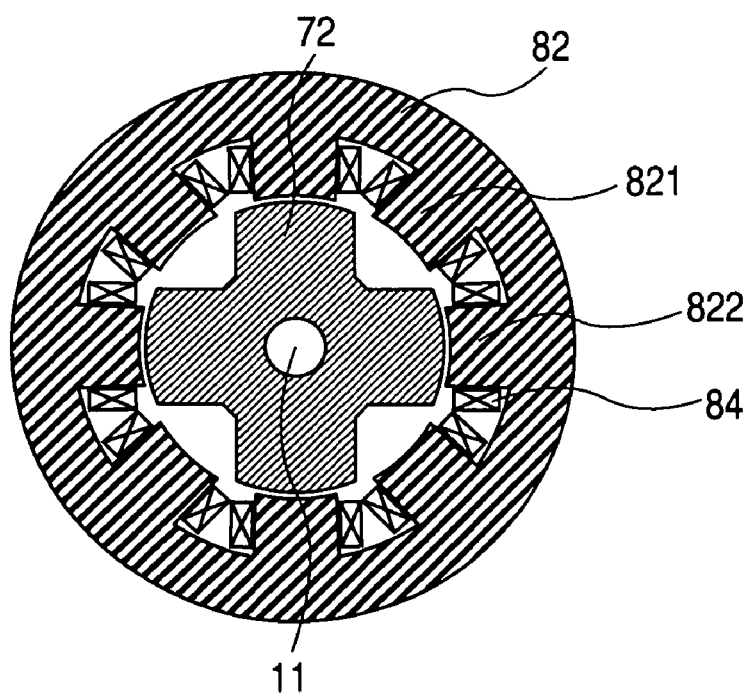
FIG. 24 is a schematic cross section of the switched reluctance motor in its radial direction taken along alternate long and short dash line N-N of FIG. 22.
Figure 25:
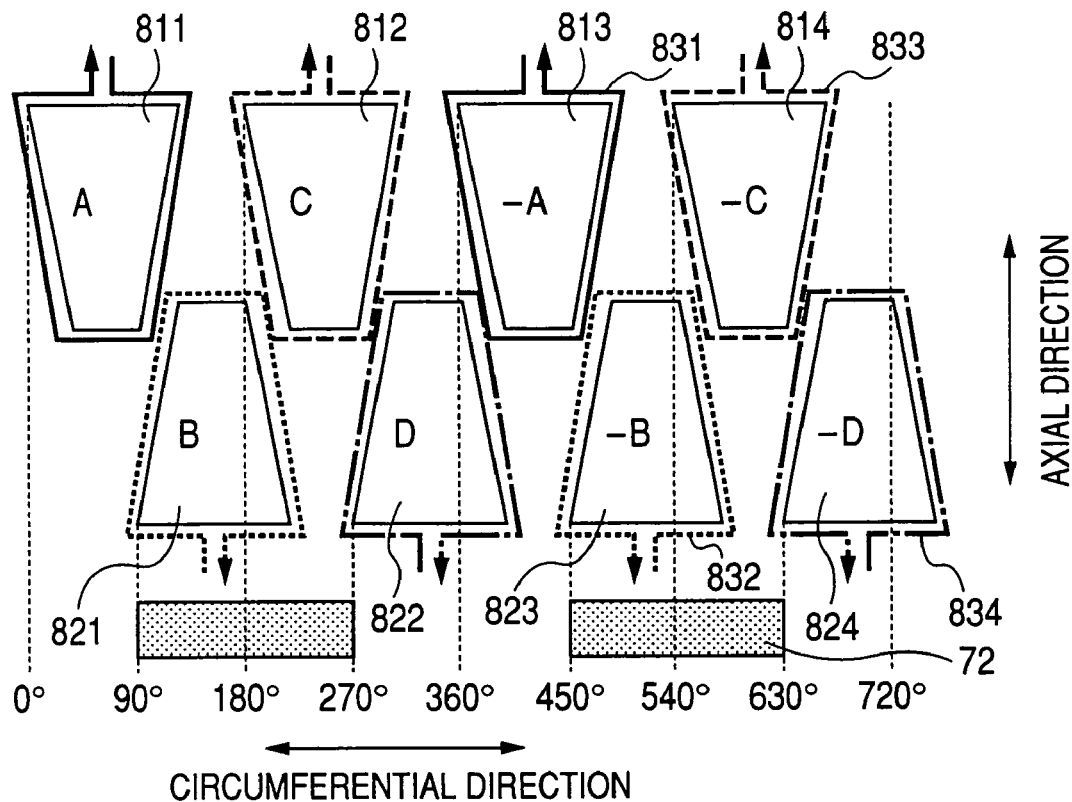
FIG. 25 is a schematic development elevation of stator magnetic poles in the switched reluctance motor toward its circumferential direction shown in FIG. 22.

FIG. 22 is a schematic cross section of the switched reluctance motor 800 in its axial direction according to the fourth embodiment. FIG. 23 is a schematic cross section of the switched reluctance motor 800 in its radial direction taken along alternate long and short dash line M-M of FIG. 22. FIG. 24 is a schematic cross section of the switched reluctance motor 800 in its radial direction taken along alternate long and short dash line N-N of FIG. 22. FIG. 25 is a schematic development elevation of stator magnetic poles in the switched reluctance motor 800 toward its circumferential direction shown in FIG. 22.

As shown in FIG. 25, the switched reluctance motor 800 according to the fourth embodiment has two stator magnet pole groups placed in the axial direction of the rotor 72. That is, the switched reluctance motor 800 according to the fourth embodiment has a four-phase and eight magnetic pole structure, like the structure of the switched reluctance motor according to the second embodiment shown in FIG. 4. In particular, in the switched reluctance motor 800 according to the fourth embodiment shown in FIG. 25, the stator magnetic poles 811 to 814 in the first stator magnetic pole group and the stator magnetic poles 821 to 824 in the second stator magnetic pole group are overlapped alternately in the axial direction. As shown in FIG. 25, each of the stator magnetic poles 811 to 814 in the first stator magnetic pole group has a trapezoid-shaped magnetic pole surface. Similarly, each of the stator magnetic poles 821 to 824 in the second stator magnetic pole group has a trapezoid-shaped magnetic pole surface.

The shorter side in the set of parallel sides in each of the stator magnetic poles 811 to 814 in the first stator magnetic pole group faces the shorter side in the set of parallel sides in each of the stator magnetic poles 821 to 824 in the second stator magnetic pole group. This structure enables the adjacent magnetic poles to magnetically overlap each other.

In the switched reluctance motor 800 according to the fourth embodiment, the phase winding 831 is reversely wound on the stator magnetic pole 811 and the stator magnetic pole 813. The stator magnetic pole 811 and the stator magnetic pole 813 are reversely magnetized to each other by the phase winding 831 using a reverse current flow.

The phase winding 833 is reversely wound on the stator magnetic pole 812 and the stator magnetic pole 814, respectively. The stator magnetic pole 812 and the stator magnetic pole 814 are reversely magnetized to each other by the phase winding 833 using a reverse current flow.

The phase winding 832 is reversely wound on the stator magnetic pole 821 and the stator magnetic pole 823, respectively. The stator magnetic pole 821 and the stator magnetic pole 823 are reversely magnetized to each other by the phase winding 832 using a reverse current flow.

The phase winding 834 is reversely wound on the stator magnetic pole 822 and the stator magnetic pole 824, respectively. The stator magnetic pole 822 and the stator magnetic pole 824 are reversely magnetized to each other by the phase winding 834 using a reverse current flow.

The rotor 72 of the switched reluctance motor 800 has the four projecting magnetic poles. The pitch of the projecting magnetic poles in the circumferential direction is electrical angle $2\pi$.

The switched reluctance motor 800 according to the fourth embodiment shown in FIG. 22 basically has the same effect as the switched reluctance motor 100 according to the first embodiment shown in FIG. 4. In addition, the switched reluctance motor 800 according to the fourth embodiment can further decrease the torque ripple because each stator magnetic pole has a trapezoid shape.

In particular, the stator magnetic poles 811 and 813 in the first stator magnetic pole group are apart from to each other by electrical angle $2\pi$ on the same circumference. However, those are electromagnetically reversed and therefore efficiently cancel each other's properties. Similarly, the stator magnetic poles 812 and 814 in the first stator magnetic pole group are apart from each other by electrical angle $2\pi$ on the same circumference. However, those are electromagnetically reversed and therefore efficiently cancel each other.

In addition, because the same phenomenon described above occurs in the second stator magnetic pole group composed of the stator magnetic poles 821, 822, 831, and 834, it is possible to balance the force that is applied to the rotor 721 made of a plurality of magnetic steel sheets which are laminated. That is, because the structure of the switched reluctance motor 800 can avoid any magnetic flux flow in a three-dimension toward the axial direction, it is possible for this structure of the fourth embodiment to form a two-dimensional magnetic flux path in the switched reluctance motor 800.

(Modification)

The present invention can use various types of the magnetic steel plate such as a bended magnet steel plate, and also use a powder magnetic core as the magnetic steel plate.

The switched reluctance motor according to the first to fourth embodiments has an inner rotor type in which the rotor is placed in the stator. The present invention is not limited by this configuration. The concept of the present invention can be applied to a switched reluctance motor having an outer rotor type in which the stator is placed in the rotor.

Fifth Embodiment

A description will now be given of the switched reluctance motor 900 according to the fifth embodiment of the present invention with reference to FIG. 29 to FIG. 30.

The switched reluctance motor 900 according to the fifth embodiment has basically the same configuration of the switched reluctance motor according to the first to third embodiments. The feature of the fifth embodiment which is different from those of the first to third embodiments will be mainly described.

Figure 29:
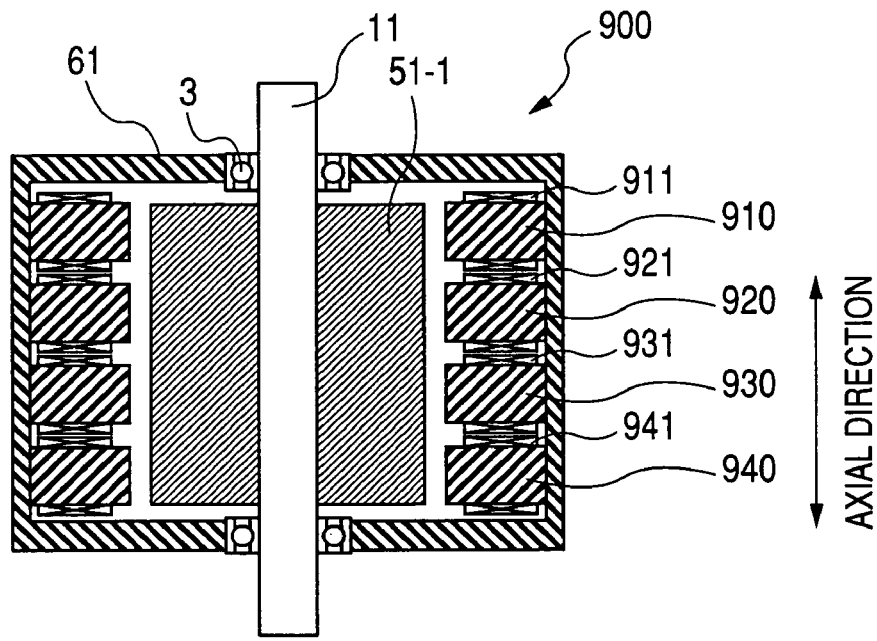
FIG. 29 is a schematic cross section of the switched reluctance motor in its axial direction as another modification according to the present invention.

FIG. 29 is a schematic cross section of the switched reluctance motor 900 in its axial direction as another modification according to the present invention. FIG. 30 is a schematic development elevation of stator magnetic poles in the switched reluctance motor 900 toward its circumferential direction shown in FIG. 29.

Figure 30:
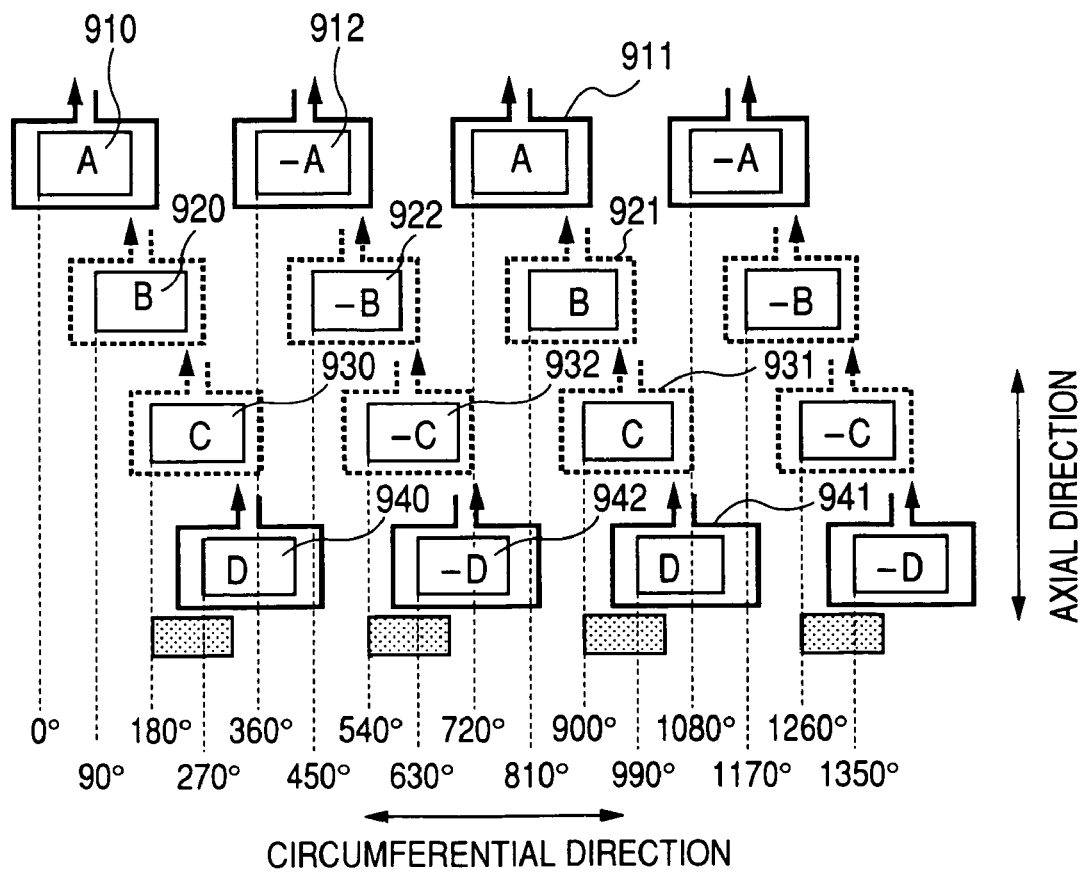
FIG. 30 is a schematic development elevation of stator magnetic poles in the switched reluctance motor toward its circumferential direction shown in FIG. 29.

Similar to FIG. 12 and FIG. 21, the horizontal axis in FIG. 30 shows various electrical angles (as an electrical angle based on the rotor magnetic pole pitch) based on the condition when the pitch between the adjacent projecting magnetic poles of the rotors is converted to the electrical angle $2\pi$.

The switched reluctance motor 900 of the fifth embodiment is a four-phase and eight magnetic pole switched reluctance motor having the single rotor 51-1.

In the switched reluctance motor 900, the stator magnetic poles 910 and 912 (omitted from FIG. 29) are alternately placed in the circumferential direction every electrical angle $2\pi$. The stator magnetic poles 910 and 912 are reversely magnetized to each other by the phase winding 711. The stator magnetic poles 920 and 922 (omitted from FIG. 29) are alternately placed in the circumferential direction every electrical angle $2\pi$. The stator magnetic poles 920 and 922 are reversely magnetized to each other by the phase winding 921. The stator magnetic poles 930 and 932 (omitted from FIG. 29) are alternately placed in the circumferential direction every electrical angle $2\pi$. The stator magnetic poles 930 and 932 are reversely magnetized to each other by the phase winding 931. The stator magnetic poles 940 and 942 (omitted from FIG. 29) are alternately placed in the circumferential direction every electrical angle $2\pi$. The stator magnetic poles 940 and 942 are reversely magnetized to each other by the phase winding 941.

According to the present invention, it is possible to sequentially arrange the necessary number of the stator magnetic pole groups in the axial direction of the switched reluctance motor. This structure can increase the torque overlapped between the adjacent magnetic poles by increasing the number of the magnetic poles arranged in the circumferential direction. The switched reluctance motor 900 according to the fifth embodiment shown in FIG. 29 and FIG. 30 has also the same effects of the switched reluctance motors of the first to fourth embodiments.

(Other Effects of the Present Invention)

According to the present invention, it is possible to other following effects.

In the switched reluctance motor as another aspect of the present invention, the stator magnetic pole group is composed only of the first stator magnetic poles and the second stator magnetic poles. This structure can substantially use one kind of the stator winding to be wound on one stator magnetic pole group. In other words, the switched reluctance motor according to the present invention has the structure in which one-type phase winding can be wound on one stator magnetic pole group. Thus, the present invention provides a simple stator winding structure.

In the switched reluctance motor as another aspect of the present invention, the stator comprises a plurality of stator magnetic pole groups that are sequentially placed in the axial direction of the rotor, and the stator magnetic poles in one adjacent stator magnetic pole group and the stator magnetic poles in the other adjacent stator magnetic pole group are shifted to each other in the circumferential direction. Because the stator magnetic poles of different phases are separately placed in the axial direction, it is possible to decrease the number of the stator magnetic poles forming one-phase stator group. As a result, it is possible to overlap in the circumferential direction a plurality of stator magnetic poles in different phases (different phases are adjacent to each other and placed in the axial direction) and further to increase the area of each stator magnetic pole in the same stator magnetic pole group in the circumferential direction. This can protect the switched reluctance motor from generating any negative torque and efficiently decrease a torque ripple. Those features markedly show the structure in which the stator magnetic pole group has the first and second stator magnetic poles that are alternately placed and the stator magnetic poles in each group are placed every electrical angle $2\pi$.

In the switched reluctance motor as another aspect of the present invention, the stator comprises first, second, and third stator magnetic pole groups that are sequentially placed in the axial direction of the rotor. The stator magnetic poles in the first stator magnetic pole group and the stator magnetic poles in the second stator magnetic pole group are shifted to each other in the circumferential direction by electrical angle $2\pi/3$. The stator magnetic poles in the second stator magnetic pole group and the stator magnetic poles in the third stator magnetic pole group are shifted to each other in the circumferential direction by electrical angle $2\pi/3$. This structure can provide a three-phase switched reluctance motor with low torque ripple, low magnetic vibration, and less noise. That is, because this structure places the stator magnetic poles in the same phase or group on a same circumference every electrical angle $\pi$, it is possible to form a main magnetic path on a two-dimensional plane using a circular-shape magnetic steel sheets and the like. This structure can increase the circumferential width of each stator magnetic pole when compared with that of the conventional switched reluctance motor. Still further, it is possible to smoothly overlap the torque waveform of each phase or group between the adjacent phases (or the adjacent stator magnetic pole groups).

In the switched reluctance motor as another aspect of the present invention, the stator comprises first and second stator magnetic pole groups that are sequentially placed in the axial direction of the rotor. The stator magnetic poles in the first stator magnetic pole group and the stator magnetic poles in the second stator magnetic pole group are shifted to each other in the circumferential direction by electrical angle π/2.

The first stator magnetic pole group has third stator magnetic poles and fourth stator magnetic poles which radially project and are alternately formed every electrical angle 2π on a same circumference of the stator. The third stator magnetic poles and the fourth stator magnetic poles are reversely magnetized by a stator coil wound on the third stator magnetic poles. The fourth stator magnetic poles are placed apart in the circumferential direction from the position of the first and second stator magnetic poles by electrical angle π. The second stator magnetic pole group has the third stator magnetic poles and the fourth stator magnetic poles which radially project and are alternately formed every electrical angle 2π on a same circumference of the stator. The third stator magnetic poles and the fourth stator magnetic poles are reversely magnetized by a stator coil wound on the third and fourth stator magnetic poles that are placed apart in the circumferential direction from the position of the first and second stator magnetic poles by electrical angle π.

In the switched reluctance motor as another aspect of the present invention, the stator coil is a concentrated coil wound on each stator magnetic pole. This can easily perform the coil winding work using the space between the adjacent stator magnetic poles.

In the switched reluctance motor as another aspect of the present invention, the stator comprises odd-number stator magnetic pole groups of not less than three that are sequentially placed in the axial direction of the rotor. That is, even if the switched reluctance motor has not less than a five-phase structure (2×N+1 phases, where N is a positive integer), it is possible to form the two-dimensional magnetic flux path by arranging the stator magnetic pole group composed of the stator magnetic poles in which the stator magnetic poles are separated from to each other by electrical angle 2π. That is, the switched reluctance motor of not less than the five-phase structure has the same effects of the switched reluctance motor of the three-phase structure prescribed.

In the switched reluctance motor as another aspect of the present invention, the stator comprises even-number stator magnetic pole groups that are sequentially placed in the axial direction. That is, even if the switched reluctance motor has not less than a four-phase structure (2×N phases, where N is a positive integer of not less than two), it is possible to form the two-dimensional magnetic flux path, like the four-phase structure, by arranging the stator magnetic pole group composed of the stator magnetic poles separated from to each other by electrical angle 2π, or like the structure of the first to fourth stator magnetic pole groups. That is, the switched reluctance motor of even-number phase structure of not less than four has the same effects of the switched reluctance motor of the four-phase structure.

It is possible to have the following structure of the switched reluctance motor.

The switched reluctance motor comprises a rotor and a stator. The rotor is made of soft magnetic material having rotor magnetic poles that radially project and formed at a predetermined circumferential pitch of electrical angle 2π on a circumference of the rotor. The stator comprises first to fourth stator magnetic pole groups that are sequentially placed in the axial direction of the rotor. In particular, each of the first and second stator magnetic pole groups has first stator magnetic poles and second stator magnetic poles that are alternately placed every electrical angle 2π in a circumferential direction and the first stator magnetic poles and the second stator magnetic poles are reversely magnetized by a stator coil wound on the first and second stator magnetic poles, and the stator magnetic poles in the first stator magnetic pole group and the stator magnetic poles in the second stator magnetic pole group are shifted to each other in the circumferential direction by electrical angle π/2. The third stator magnetic pole group has third stator magnetic poles and fourth stator magnetic poles that are alternately formed every electrical angle 2π on a same circumference of the stator, in which the third stator magnetic poles and the fourth stator magnetic poles are reversely magnetized by a stator coil wound on the third and fourth stator magnetic poles and are placed apart in the circumferential direction from the first and second stator magnetic poles in the first stator magnetic-pole group by electrical angle π. The fourth stator magnetic-pole group has the third stator magnetic poles and the fourth stator magnetic poles that are alternately formed every electrical angle 2π on a same circumference of the stator, in which the third stator magnetic poles and the fourth stator magnetic poles are reversely magnetized by a stator coil wound on the third and fourth stator magnetic poles, and are placed apart in the circumferential direction from the first and second stator magnetic poles in the second stator magnetic-pole group by electrical angle π.

In particular, the third and fourth stator magnetic poles in the third stator magnetic pole group and the third and fourth stator magnetic poles in the fourth stator magnetic pole group are shifted to each other in the circumferential direction by electrical angle π/2.

This structure provides a four-phase switched reluctance motor with low torque ripple, low magnetic vibration, and less noise. That is, because this structure can form eight types of the stator poles placed at eight phase angle position using four windings, it is possible to decrease the torque ripple, the magnetic vibration, and noise. Further, because the stator magnetic poles in the same phase (or the same magnetic pole group) are placed on a same circumference every electrical angle π, it is possible to form a main magnetic path on a two-dimensional plane using circular-shape magnetic steel sheets and the like. This structure can increase the circumferential width of each stator magnetic pole when compared with that of the conventional switched reluctance motor. Still further, it is possible to smoothly overlap the torque waveform of each phase or group between the adjacent phases (or the adjacent stator magnetic pole groups).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A switched reluctance motor comprising:
a rotor made of soft magnetic material having rotor magnetic poles that radially project outward and are arranged at a predetermined circumferential pitch of electrical angle 2π on a circumference of the rotor; and
a stator having a plurality of stator magnetic pole groups which are arranged in an axial direction of the stator and shifted in the circumferential direction of the stator relative to each other, each of the stator magnetic pole groups comprising first stator magnetic poles and second stator magnetic poles that radially project inward and are alternately arranged at a predetermined circumferential pitch of electrical angle $2\pi$ in which adjacent stator magnetic poles in each of the first stator magnetic poles and second stator magnetic poles are reversely magnetized relative to each other by a stator coil wound on the first stator magnetic poles and the second stator magnetic poles.

2. The switched reluctance motor according to claim 1, wherein each of the stator magnetic pole groups is composed only of first stator magnetic poles and second stator magnetic poles.

3. The switched reluctance motor according to claim 2, wherein
the stator magnetic poles in one stator magnetic pole group are shifted in the circumferential direction of the stator to the stator magnetic poles in the other stator magnetic pole group.

4. The switched reluctance motor according to claim 1, wherein the stator comprises first, second, and third stator magnetic pole groups that are sequentially placed in the axial direction of the rotor, and
the stator magnetic poles in the first stator magnetic pole group and the stator magnetic poles in the second stator magnetic pole group are shifted to each other in the circumferential direction by electrical angle $2\pi/3$, and
the stator magnetic poles in the second stator magnetic pole group and the stator magnetic poles in the third stator magnetic pole group are shifted to each other in the circumferential direction by electrical angle $2\pi/3$.

5. The switched reluctance motor according to claim 1, wherein the stator comprises first and second stator magnetic pole groups that are sequentially placed in the axial direction of the rotor, and
the stator magnetic poles in the first stator magnetic pole group and the stator magnetic poles in the second stator magnetic pole group are shifted to each other in the circumferential direction by electrical angle $\pi/2$, and
the first stator magnetic pole group having third stator magnetic poles and fourth stator magnetic poles that radially project and are alternately formed every electrical angle angle $2\pi$ on a same circumference of the stator, in which the third stator magnetic poles and the fourth stator magnetic poles are reversely magnetized by a stator coil wound on the third stator magnetic poles and fourth stator magnetic poles that are placed apart in the circumferential direction from the position of the first and second stator magnetic poles by electrical angle $\pi$, and
the second stator magnetic pole group having the third stator magnetic poles and the fourth stator magnetic poles that radially project and are alternately formed every electrical angle angle $2\pi$ on a same circumference of the stator, in which the third stator magnetic poles and the fourth stator magnetic poles are reversely magnetized by a stator coil wound on the third and fourth stator magnetic poles that are placed apart in the circumferential direction from the position of the first and second stator magnetic poles by electrical angle $\pi$.

6. The switched reluctance motor according to claim 1, wherein the stator coil is a concentrated coil wound on each stator magnetic pole.

7. The switched reluctance motor according to claim 1, wherein the stator comprises odd-number stator magnetic pole groups of not less than three that are sequentially placed in the axial direction of the rotor.

8. The switched reluctance motor according to claim 1, wherein
the number of the stator magnetic pole groups arranged in the axial direction of the stator is an even number.

9. The switched reluctance motor according to claim 1, wherein the plurality of stator magnetic pole groups is composed of a first stator magnetic pole group, a second stator magnetic pole group, and a third stator magnetic pole group which are arranged in the axial direction of the stator relative to each other,
the stator magnetic poles belonging to the first stator magnetic pole group and the stator magnetic poles belonging to the second stator magnetic pole group are shifted relative to each other in the circumferential direction by electrical angle $\pi/3$, and
the stator magnetic poles belonging to the second stator magnetic pole group and the stator magnetic poles belonging to the third stator magnetic pole group are shifted relative to each other in the circumferential direction by electrical angle $\pi/3$.

10. The switched reluctance motor according to claim 1, wherein the plurality of stator magnetic pole groups is composed of a first stator magnetic pole group and a second stator magnetic pole group which are arranged in the axial direction of the stator to each other,
the stator magnetic poles belonging to the first stator magnetic pole group are shifted relative to the stator magnetic poles belonging to the second stator magnetic pole group in the circumferential direction by electrical angle $\pi/4$,
each of the first stator magnetic pole group and the second stator magnetic pole group is composed of first stator magnetic poles and second stator magnetic poles, and
each of the first stator magnetic pole group and the second stator magnetic pole group further has third stator magnetic poles and fourth stator magnetic poles which are arranged in the circumferential direction of the stator every electrical angle $\pi/2$ to the first stator magnetic poles and the second stator magnetic poles.

11. A switched reluctance motor comprising:
a plurality of rotors, made of soft magnetic material, having rotor magnetic poles that radially project outward from the rotors and are arranged at a predetermined circumferential pitch of electrical angle $\pi$ on a circumference of the rotors; and
a plurality of stators having a plurality of stator magnetic poles, each stator having a stator magnetic pole group which corresponds to the plurality of stator magnetic poles located at each stator, the plurality of stator magnetic pole groups are arranged in an axial direction of the stators and shifted in the circumferential direction of the stators relative to the other stator magnetic pole groups, each of the stator magnetic pole groups includes a first stator magnetic pole subgroup corresponding to some of the plurality of stator magnetic poles located at the stator and second stator magnetic pole subgroup corresponding to the other stator magnetic poles located at the stator, the plurality of stator magnetic poles radially project inward and are alternately arranged at a predetermined circumferential pitch of electrical angle $\pi$ in which adjacent stator magnetic poles in each subgroup are reversely magnetized relative to each other by a stator coil wound on each of the stator magnetic pole subgroups.

12. The switched reluctance motor according to claim 11, wherein the stator coil is reversely wound on adjacent stator magnetic poles in each stator magnetic pole subgroup.

13. The switched reluctance motor according to claim 12, wherein the plurality of stator magnetic pole groups arranged in the axial direction of the stators, overlap in the circumferential direction of the stators relative to each other.

* * * * *

UNITED STATES PATENT AND TRADEMARK OFFICE
CERTIFICATE OF CORRECTION

PATENT NO. : 7,781,931 B2  Page 1 of 1
APPLICATION NO. : 12/081928
DATED : August 24, 2010
INVENTOR(S) : Tomokazu Ishikawa et al.

It is certified that error appears in the above-identified patent and that said Letters Patent is hereby corrected as shown below:

Column 17, line 46, please correct claim 5 as follows:

--~~angle~~--;

Column 17, line 57, please correct claim 5 as follows:

--~~angle~~--;

Column 18, line 50, please correct claim 11 as follows:

--~~angle π~~angle 2π--;

Column 18, line 66, please correct claim 11 as follows:

--~~angle π~~angle 2π--;

Signed and Sealed this

Seventh Day of December, 2010

David J. Kappos
*Director of the United States Patent and Trademark Office*